(12) United States Patent
Kurokawa

(10) Patent No.: US 9,362,984 B2
(45) Date of Patent: Jun. 7, 2016

(54) SEMICONDUCTOR DEVICE

(71) Applicant: Semiconductor Energy Laboratory Co., Ltd., Atsugi-shi, Kanagawa-ken (JP)

(72) Inventor: Yoshiyuki Kurokawa, Sagamihara (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 594 days.

(21) Appl. No.: 13/785,359

(22) Filed: Mar. 5, 2013

(65) Prior Publication Data

US 2013/0181540 A1    Jul. 18, 2013

Related U.S. Application Data

(63) Continuation of application No. 13/267,007, filed on Oct. 6, 2011, now Pat. No. 8,396,425, which is a continuation of application No. 12/948,300, filed on Nov. 17, 2010, now Pat. No. 8,041,309, which is a continuation of application No. 11/976,378, filed on Oct. 24, 2007, now Pat. No. 7,840,188.

(30) Foreign Application Priority Data

Oct. 31, 2006   (JP) ................................ 2006-296650

(51) Int. Cl.
*H01F 27/42* (2006.01)
*H01F 38/00* (2006.01)
(Continued)

(52) U.S. Cl.
CPC .......... *H04B 5/0037* (2013.01); *G06F 15/7832* (2013.01); *Y02B 60/1207* (2013.01); *Y02B 60/1225* (2013.01)

(58) Field of Classification Search
CPC .. H04B 5/0037; H04B 5/0031; H04B 5/0081; H04B 5/0075; H04B 5/0093; H04B 5/02; H04B 11/00; H04B 1/40; H04B 2203/5454; H04B 2203/5483; H04B 3/548; H04B 5/00; H04B 5/005; H04B 5/0087
USPC .......................................................... 307/104
See application file for complete search history.

(56) References Cited

U.S. PATENT DOCUMENTS

| 5,620,906 A | 4/1997 | Yamaguchi et al. |
| 5,897,346 A | 4/1999 | Yamaguchi et al. |

(Continued)

FOREIGN PATENT DOCUMENTS

| EP | 1363149 A | 11/2003 |
| EP | 1659482 A | 5/2006 |

(Continued)

OTHER PUBLICATIONS

Korean Office Action (Application No. 2009-7011103) Dated Feb. 25, 2014.

(Continued)

*Primary Examiner* — Jared Fureman
*Assistant Examiner* — Esayas Yeshaw
(74) *Attorney, Agent, or Firm* — Robinson Intellectual Property Law Office; Eric J. Robinson

(57) ABSTRACT

In a multi-core semiconductor device, a data bus between CPUs or the like consumes a larger amount of power. By provision of a plurality of CPUs which transmit data by a backscattering method of a wireless signal, a router circuit which mediates data transmission and reception between the CPUs or the like, and a thread control circuit which has a thread scheduling function, a semiconductor device which consumes less power and has high arithmetic performance can be provided at low cost.

8 Claims, 18 Drawing Sheets

(51) Int. Cl.
*H01F 37/00* (2006.01)
*H04B 5/00* (2006.01)
*G06F 15/78* (2006.01)

(56) References Cited

U.S. PATENT DOCUMENTS

| | | | |
|---|---|---|---|
| 5,898,909 A * | 4/1999 | Yoshihara | H01L 23/552 |
| | | | 257/E23.114 |
| 6,005,304 A * | 12/1999 | Seelig | H02J 5/005 |
| | | | 307/104 |
| 6,094,031 A | 7/2000 | Shimane et al. | |
| 6,174,757 B1 | 1/2001 | Yamaguchi et al. | |
| 6,351,630 B2 | 2/2002 | Wood | |
| 6,611,224 B1 * | 8/2003 | Nysen | G01S 13/755 |
| | | | 342/175 |
| 6,709,906 B2 | 3/2004 | Yamaguchi et al. | |
| 6,711,447 B1 | 3/2004 | Saeed | |
| 7,107,361 B2 | 9/2006 | Tokuhara | |
| 7,137,091 B1 | 11/2006 | Jung et al. | |
| 7,206,906 B1 | 4/2007 | Cholleti et al. | |
| 7,212,961 B2 | 5/2007 | Settles | |
| 7,233,250 B2 | 6/2007 | Forster | |
| 7,254,676 B2 | 8/2007 | Datta et al. | |
| 7,263,457 B2 | 8/2007 | White et al. | |
| 7,281,127 B2 | 10/2007 | Rothman et al. | |
| 7,283,035 B2 | 10/2007 | Tuttle et al. | |
| 7,283,037 B2 | 10/2007 | Diorio et al. | |
| 7,342,258 B2 | 3/2008 | Yamazaki et al. | |
| 7,487,504 B2 | 2/2009 | Peterson | |
| 7,921,183 B2 | 4/2011 | Kawamura | |
| 2003/0067894 A1 * | 4/2003 | Schmidt | H04W 88/06 |
| | | | 370/329 |
| 2006/0212677 A1 | 9/2006 | Fossum | |
| 2008/0211636 A1 | 9/2008 | O'Toole et al. | |
| 2010/0022204 A1 | 1/2010 | Rofougaran | |
| 2010/0214187 A1 * | 8/2010 | Sugita | G06K 19/07749 |
| | | | 343/788 |

FOREIGN PATENT DOCUMENTS

| | | |
|---|---|---|
| EP | 2312566 A | 4/2011 |
| JP | 04-025046 A | 1/1992 |
| JP | 04-305757 A | 10/1992 |
| JP | 05-012220 A | 1/1993 |
| JP | 07-084971 A | 3/1995 |
| JP | 10-256478 A | 9/1998 |
| JP | 2001-298197 A | 10/2001 |
| JP | 2002-202958 A | 7/2002 |
| JP | 2003-196612 A | 7/2003 |
| JP | 2003-241980 A | 8/2003 |
| JP | 2005-101892 A | 4/2005 |
| JP | 2005-346672 A | 12/2005 |
| JP | 2006-238282 A | 9/2006 |
| JP | 2006-260568 A | 9/2006 |
| JP | 2006-268070 A | 10/2006 |
| KR | 2003-0088372 A | 11/2003 |
| KR | 2006-0055398 A | 5/2006 |

OTHER PUBLICATIONS

"Content Transmission Enable Only by Putting Low Power Consumption Radio Transmission Developed by Sony Applying Non-Feeding System of Wireless Tag," Nikkei Electronics, Oct. 9, 2006, No. 936, pp. 40-41.

Kurland.A et al., "Development of a Multi-Core Type Microprocessor for Connecting CPU Cores Via a Network," Nikkei Electronics, Sep. 25, 2006, No. 935, pp. 179-186.

International Search Report (Application No. PCT/JP2007/070868) Dated Jan. 29, 2008.

Written Opinion (Application No. PCT/JP2007/070868) Dated Jan. 29, 2008.

* cited by examiner

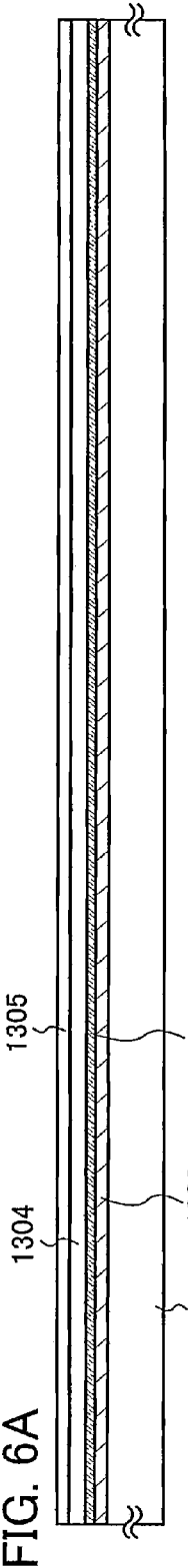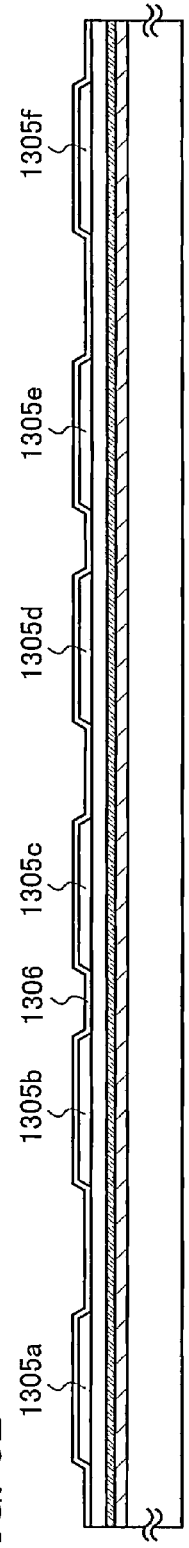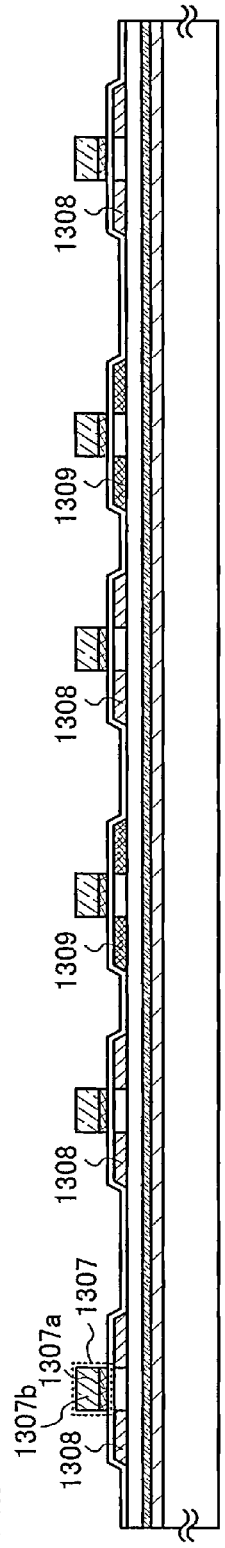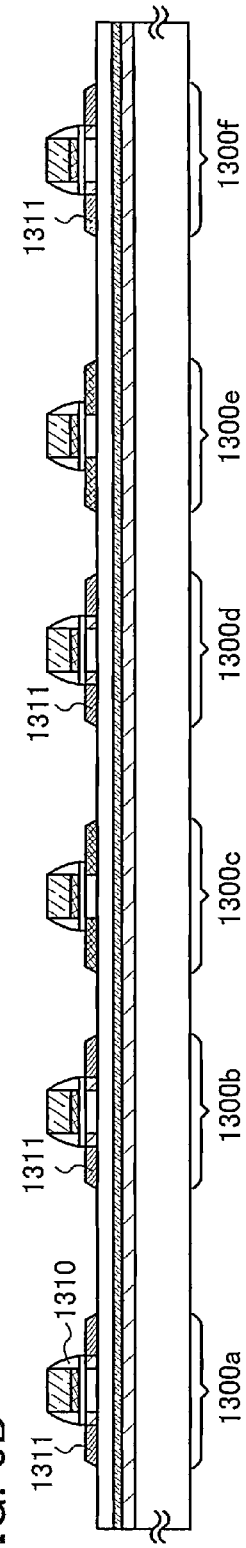

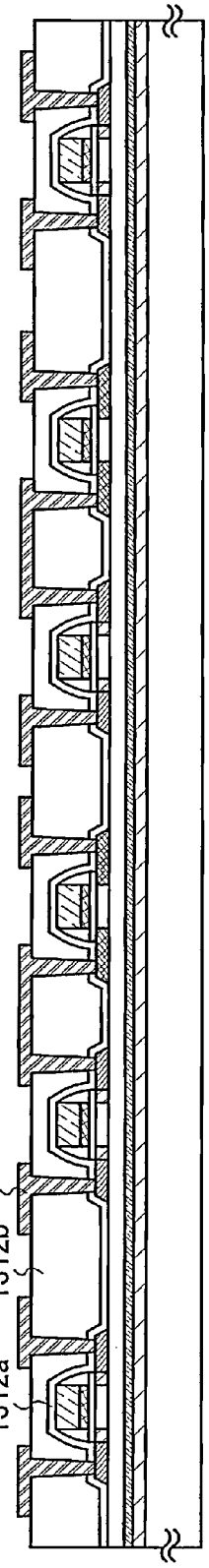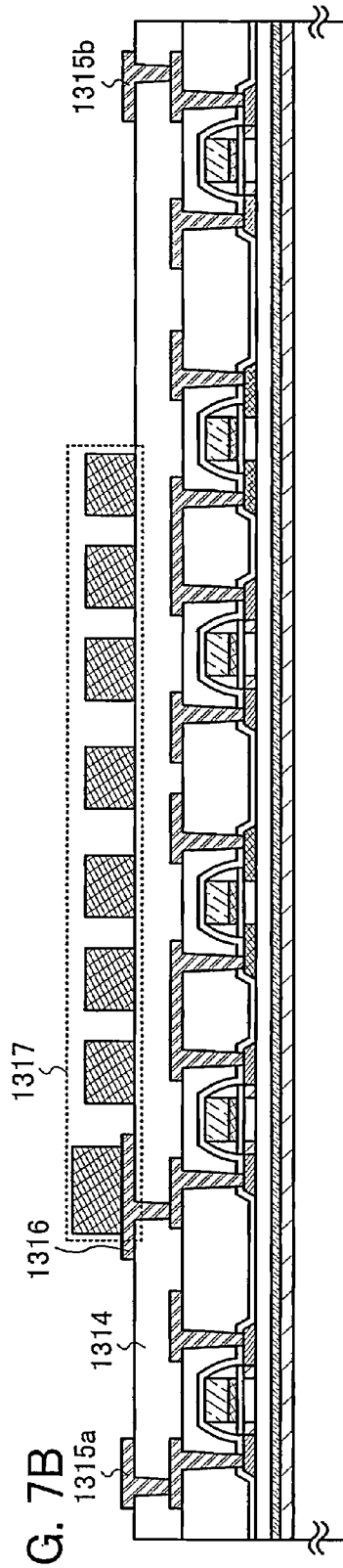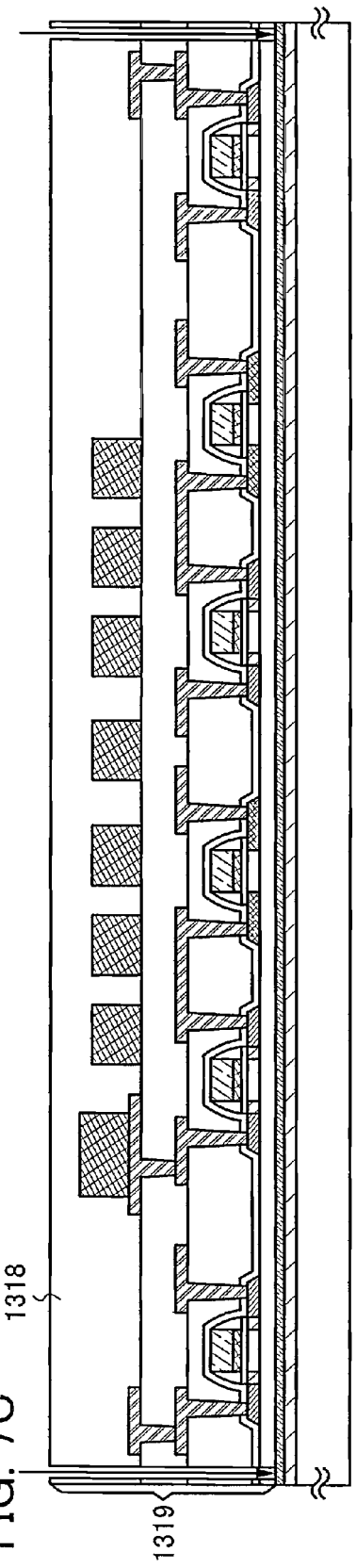

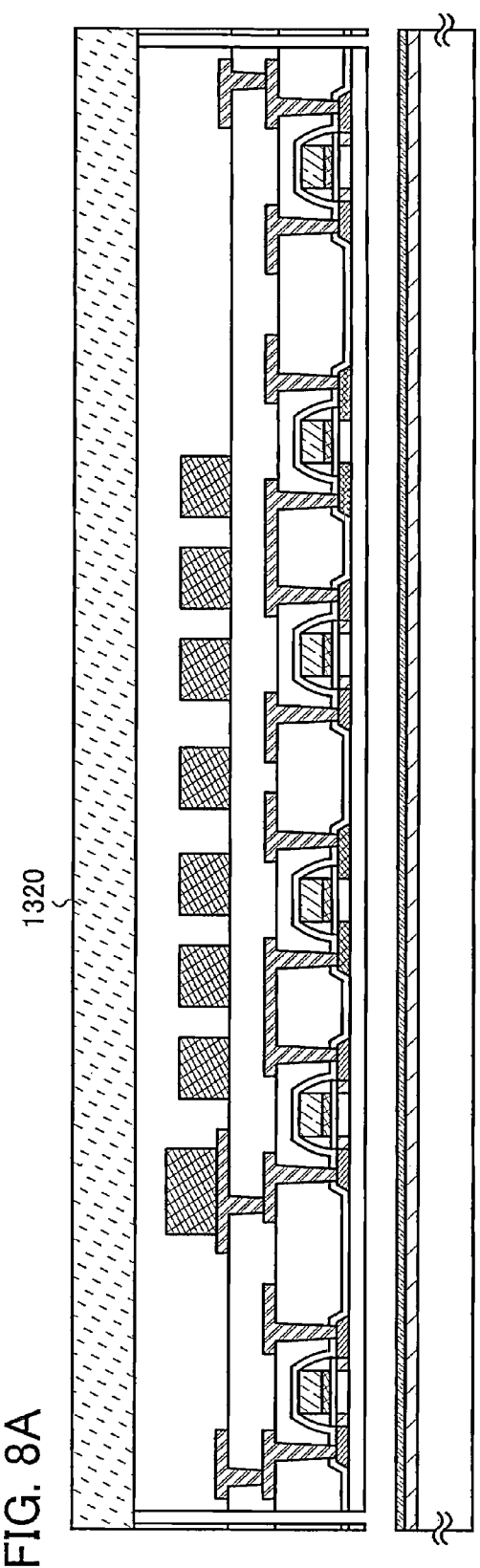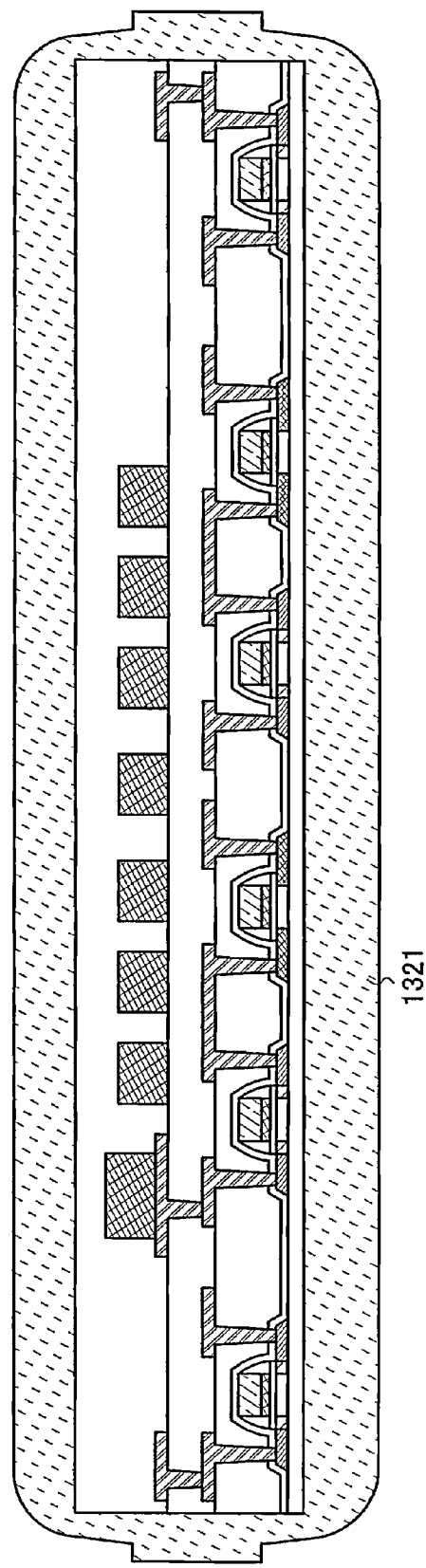

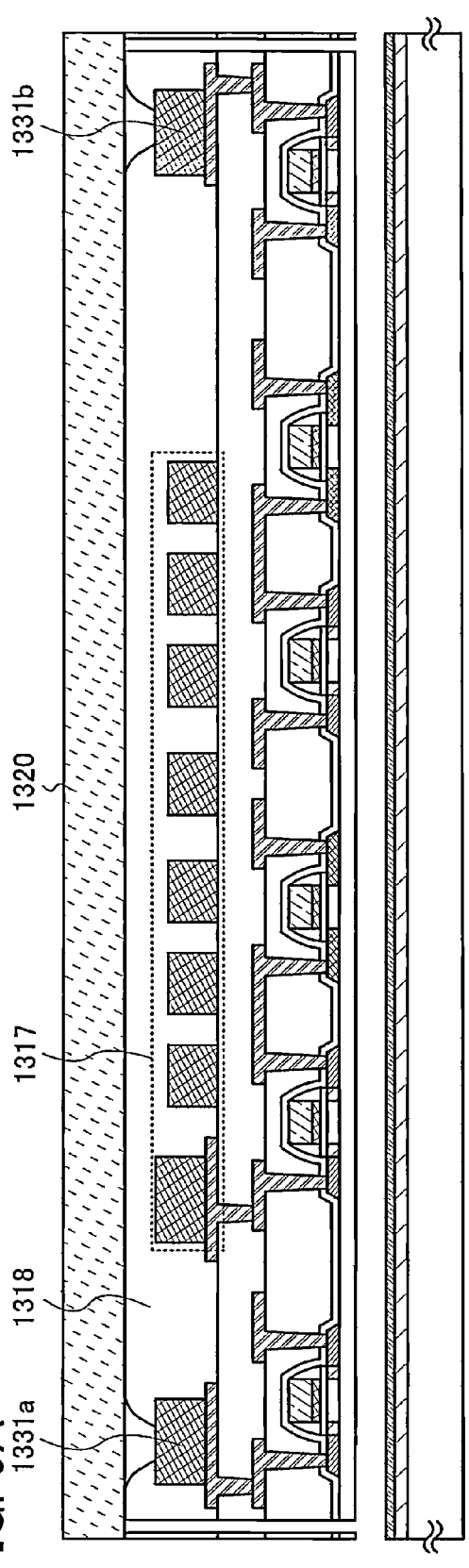
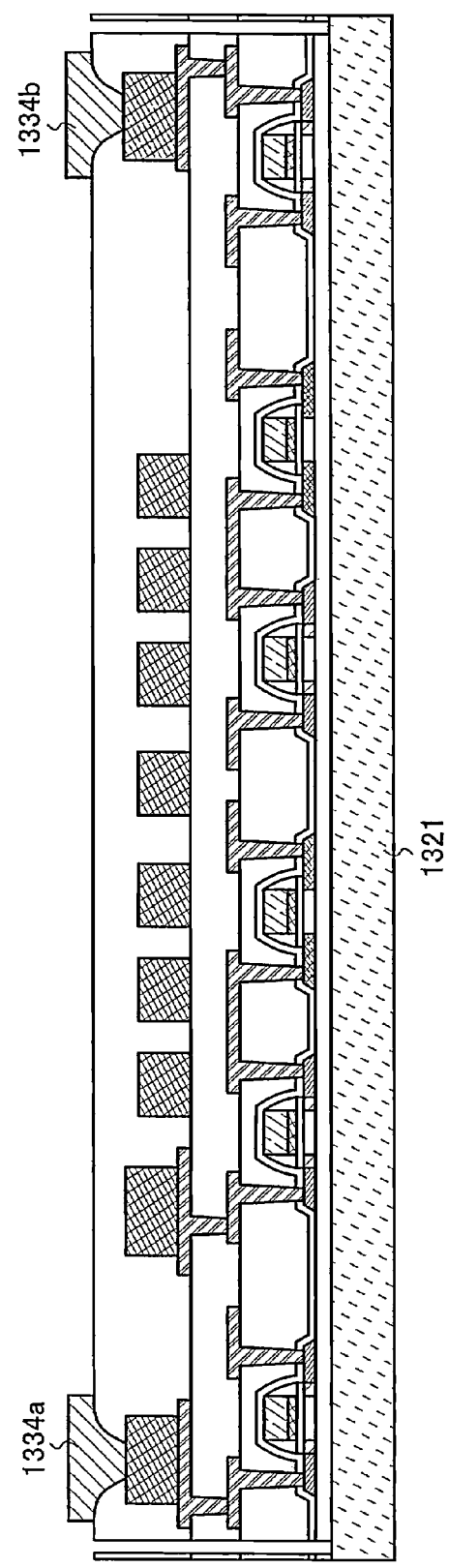

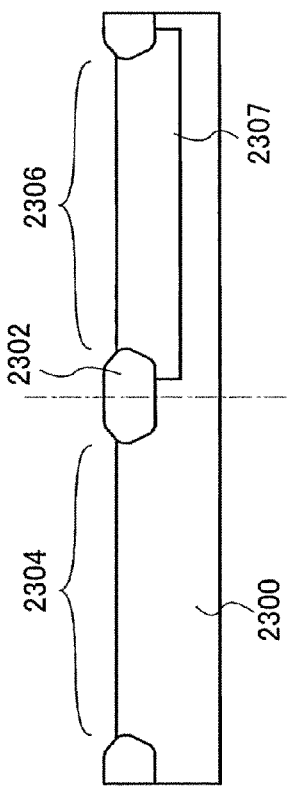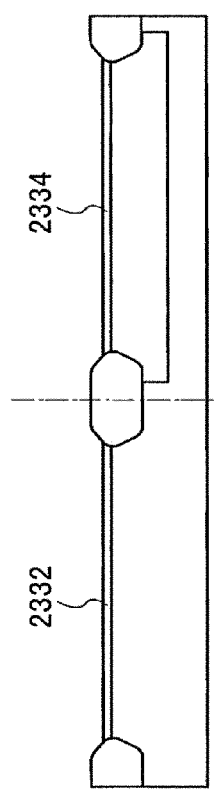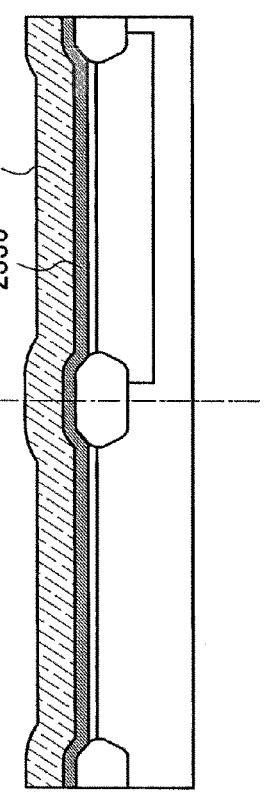

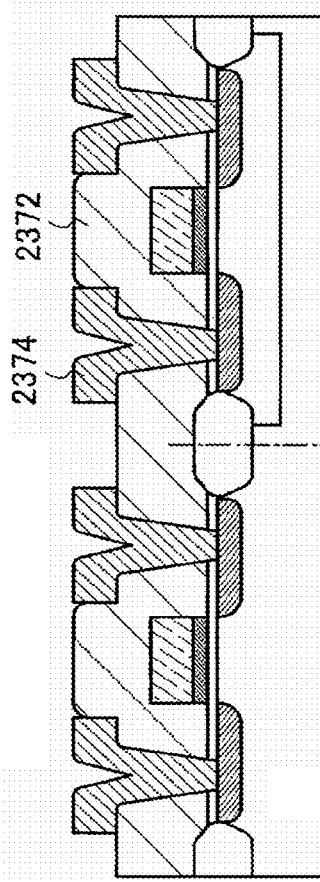
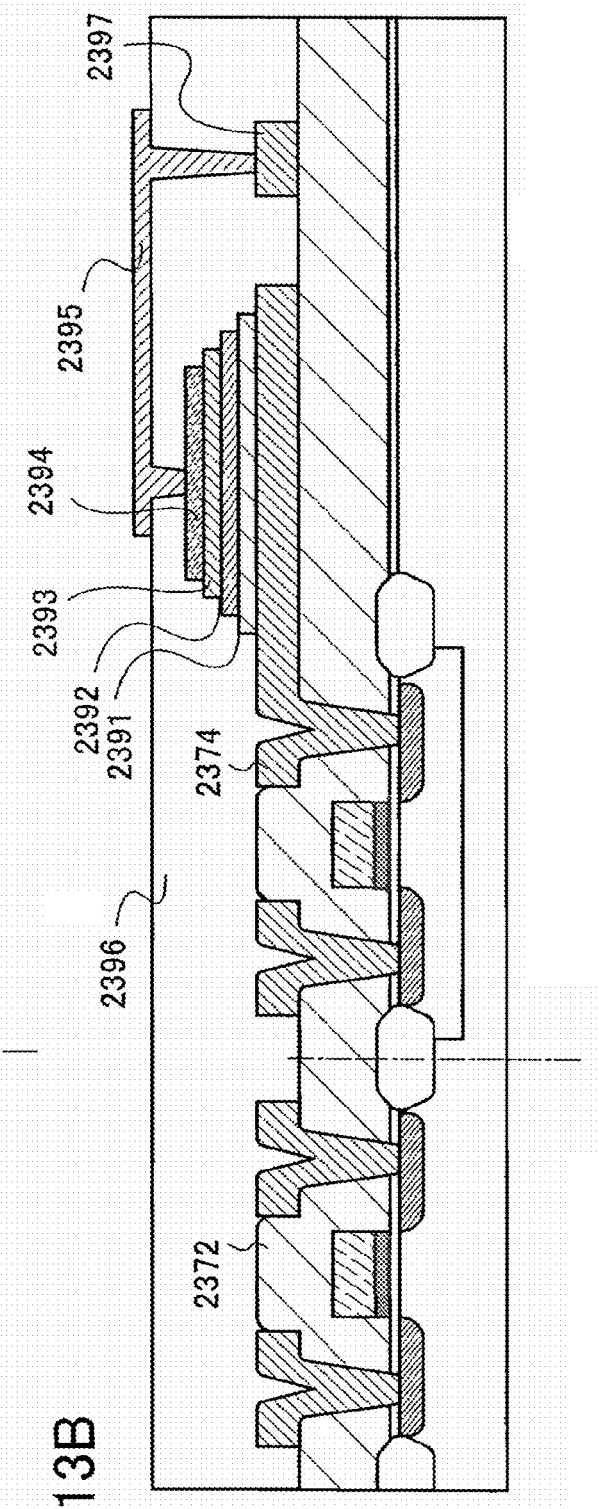
FIG. 13A
FIG. 13B

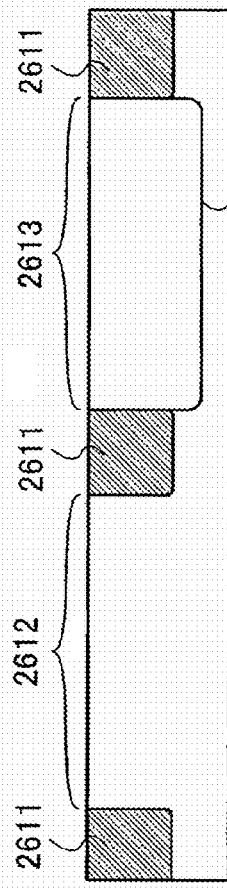
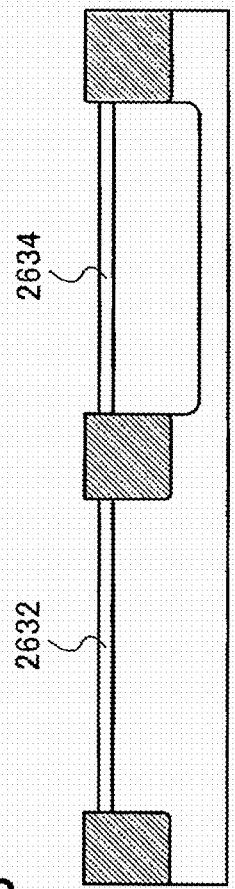
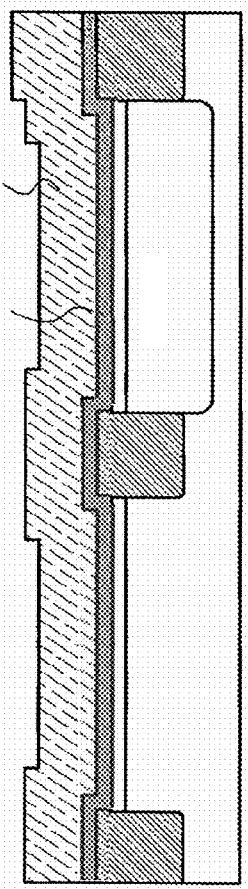
FIG. 15A
FIG. 15B
FIG. 15C

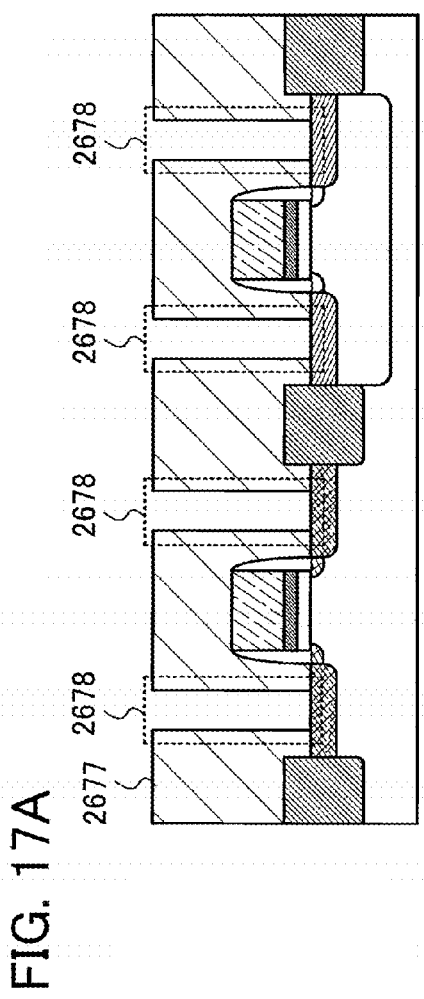
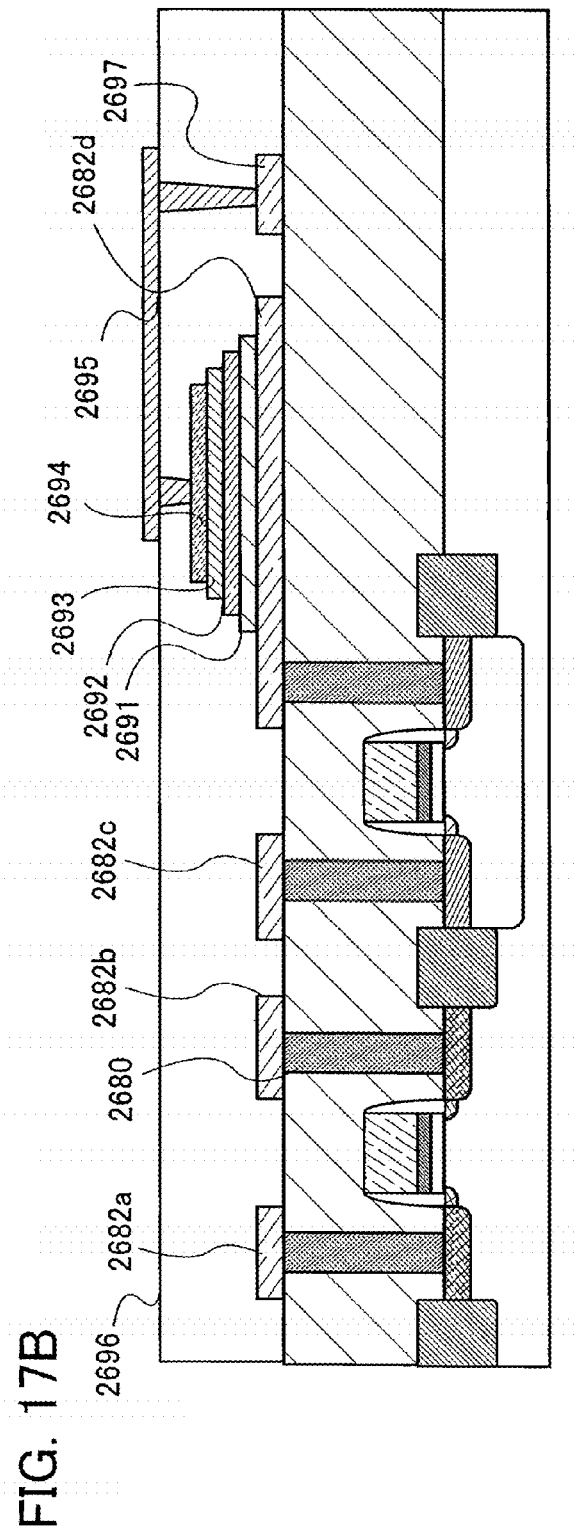
FIG. 17A
FIG. 17B

SEMICONDUCTOR DEVICE

TECHNICAL FIELD

The present invention relates to a semiconductor device having a plurality of CPUs, which is called a multi-core semiconductor device.

BACKGROUND ART

Currently, almost all central processing units (CPUs) included in semiconductor devices adopt an architecture called a stored-program system. In this stored-program system, instructions to be processed by a CPU and data necessary for the processing are stored in a memory, and the CPU performs processing by sequentially reading data from the memory. Therefore, for the semiconductor device having a CPU, techniques for increasing an operating frequency of CPU and increasing a memory access rate are employed in order to improve performance.

The semiconductor device can have higher arithmetic processing performance by increasing the operating frequency of the CPU. However, the amount of electric power consumed by the semiconductor device is increased in proportion to the operating frequency. In addition, an increase in operating frequency generally requires an increase in circuit size of the CPU. Thus, the CPU consumes more power as the operating frequency is increased. Therefore, there has been proposed a system for improving overall processing performance of a semiconductor device by providing a plurality of CPUs which consume less power due to suppressed circuit size and operating frequency and by distributing processes to all of the CPUs (for example, Reference 1: Japanese Published Patent Application No. 2006-268070). Such a system may be referred to as a multi-core system.

As the multi-core system, various structures and data processing methods have been proposed, such as a symmetric multiprocessing (SMP) system where CPUs are treated equally, an asymmetric multiprocessing (AMP) system where CPUs are treated unequally, a single instruction multiple data (SIMD) method in which plural pieces of data are processed with a single instruction, and a multiple instruction multiple data (MIMD) method in which plural pieces of data are processed with plural instructions. The multi-core system can reduce power consumption of each CPU.

DISCLOSURE OF INVENTION

However, even if the multi-core system is employed, since data transmission and reception between CPUs or the like become necessary, an increase in the amount of power consumed by a data bus for them becomes a problem.

In view of the above problem, it is an object of the present invention to provide a semiconductor device which is prevented from consuming more power even if it has a plurality of CPUs.

A semiconductor device of the present invention includes a plurality of CPUs, a router circuit, and a thread control circuit. Each CPU functions to transmit and receive data to and from the router circuit with a wireless signal. The router circuit functions to transmit and receive data to and from each CPU with a wireless signal. The thread control circuit has a function to allocate an instruction to be executed by each CPU, i.e., a scheduling function.

Data transmission from each CPU to the router circuit is carried out through modulation of a wireless signal. Modulation such as phase modulation or amplitude modulation is achieved by turning on or off a switch of a wireless circuit included in each CPU. With the use of such a modulation method, i.e., a backscattering method, the amount of power needed for data transmission from each CPU can be reduced.

A feature of the semiconductor device of the present invention disclosed in this specification is to include a plurality of CPUs, a router circuit, a thread control circuit connected to the router circuit through a first bus, and an external device controller connected to the router circuit through a second bus. Each of the plurality of CPUs includes a first wireless circuit which includes a first antenna circuit, a first demodulation circuit, and a first modulation circuit and a CPU core which includes a control circuit, an arithmetic circuit, a cache memory, and a general purpose register. The router circuit includes a data processing circuit and a second wireless circuit which includes a second antenna circuit, a second demodulation circuit, and a second modulation circuit. The first wireless circuit and the second wireless circuit each function to transmit and receive data between the CPU and the router circuit with a wireless signal. The first wireless circuit functions to transmit data to the second wireless circuit by a backscattering method. The data processing circuit functions to process and store first data to be transmitted to or received from each of the plurality of CPUs, second data to be transmitted to or received from the thread control circuit, and third data to be transmitted to or received from the external device controller. The thread control circuit functions to appropriately allocate an instruction to be executed by the CPU core to the CPU core. The external device controller functions to transmit and receive data to and from an external device which is connected through an external data input line and an external data output line.

Another feature of the semiconductor device of the present invention disclosed in this specification is to include a plurality of CPUs, a router circuit, a thread control circuit connected to the router circuit through a first bus, and an external device controller connected to the router circuit through a second bus. Each of the plurality of CPUs includes a first wireless circuit which includes a first antenna circuit, a first demodulation circuit, a first modulation circuit, and a power supply circuit and a CPU core which includes a control circuit, an arithmetic circuit, a cache memory, and a general purpose register. The power supply circuit functions to generate a power supply voltage to be supplied to the CPU from a wireless signal received by the first antenna circuit. The router circuit includes a data processing circuit and a second wireless circuit which includes a second antenna circuit, a second demodulation circuit, and a second modulation circuit. The first wireless circuit and the second wireless circuit function to transmit and receive data between the CPU and the router circuit with a wireless signal. The first wireless circuit functions to transmit data to the second wireless circuit by a backscattering method. The data processing circuit functions to process and store first data to be transmitted to or received from each of the plurality of CPUs, second data to be transmitted to or received from the thread control circuit, and third data to be transmitted to or received from the external device controller. The thread control circuit functions to appropriately allocate an instruction to be executed by the CPU core to the CPU core. The external device controller functions to transmit and receive data to and from an external device which is connected through an external data input line and an external data output line.

Another feature of the semiconductor device of the present invention disclosed in this specification is to include a plurality of CPUs, a router circuit, a thread control circuit connected to the router circuit through a first bus, and an external device controller connected to the router circuit through a second bus. Each of the plurality of CPUs includes a first wireless circuit which includes a first antenna circuit, a third antenna circuit, a first demodulation circuit, a first modulation circuit, a first power supply circuit, and a second power supply circuit and a CPU core which includes a control circuit, an arithmetic circuit, a cache memory, and a general purpose register. The first power supply circuit functions to generate a power supply voltage to be supplied to the CPU from a first wireless signal received by the first antenna circuit. The second power supply circuit includes a step-up circuit and functions to generate a power supply voltage to be supplied to the CPU from a second wireless signal received by the third antenna circuit. The router circuit includes a data processing circuit and a second wireless circuit which includes a second antenna circuit, a second demodulation circuit, and a second modulation circuit. The first wireless circuit and the second wireless circuit function to transmit and receive data between the CPU and the router circuit with a wireless signal. The first wireless circuit functions to transmit data to the second wireless circuit by a backscattering method. The data processing circuit functions to process and store first data to be transmitted to or received from each of the plurality of CPUs, second data to be transmitted to or received from the thread control circuit, and third data to be transmitted to or received from the external device controller. The thread control circuit functions to appropriately allocate an instruction to be executed by the CPU core to the CPU core. The external device controller functions to transmit and receive data to and from an external device which is connected through an external data input line and an external data output line.

In the semiconductor device of the present invention having the above structure, the external device controller can be a DRAM controller, a PCI bus controller, or a USB controller.

Each CPU may be formed using a thin film transistor which includes as an active layer a semiconductor thin film formed over a substrate having an insulating surface. Note that the substrate having an insulating surface is preferably one of a glass substrate, a plastic substrate, and a silicon-on-insulator (SOI) substrate.

The present invention can provide a multi-core semiconductor device which consumes less power and has high arithmetic performance, at low cost. By providing a plurality of CPUs, a router circuit, and a thread control circuit and employing a backscattering method for data transmission from each CPU to the router circuit, the present invention can also provide a semiconductor device which can transmit data from each CPU to the router circuit while consuming a very small amount of power. The present invention can further provide a semiconductor device having a lot of flexibility in physical form because the CPU does not need to be electrically connected to another CPU, the router circuit, the thread control circuit, and an external terminal.

BRIEF DESCRIPTION OF DRAWINGS

FIGS. 6A to 6D show an example of a method for manufacturing a semiconductor device of the present invention.

FIGS. 7A to 7C show an example of a method for manufacturing a semiconductor device of the present invention.

FIGS. 8A and 8B show an example of a method for manufacturing a semiconductor device of the present invention.

FIGS. 9A and 9B show an example of a method for manufacturing a semiconductor device of the present invention.

FIGS. 11A to 11C show an example of a method for manufacturing a semiconductor device of the present invention.

FIGS. 13A and 13B show an example of a method for manufacturing a semiconductor device of the present invention.

FIGS. 15A to 15C show an example of a method for manufacturing a semiconductor device of the present invention.

FIGS. 17A and 17B show an example of a method for manufacturing a semiconductor device of the present invention.

BEST MODE FOR CARRYING OUT THE INVENTION

Figure 1:
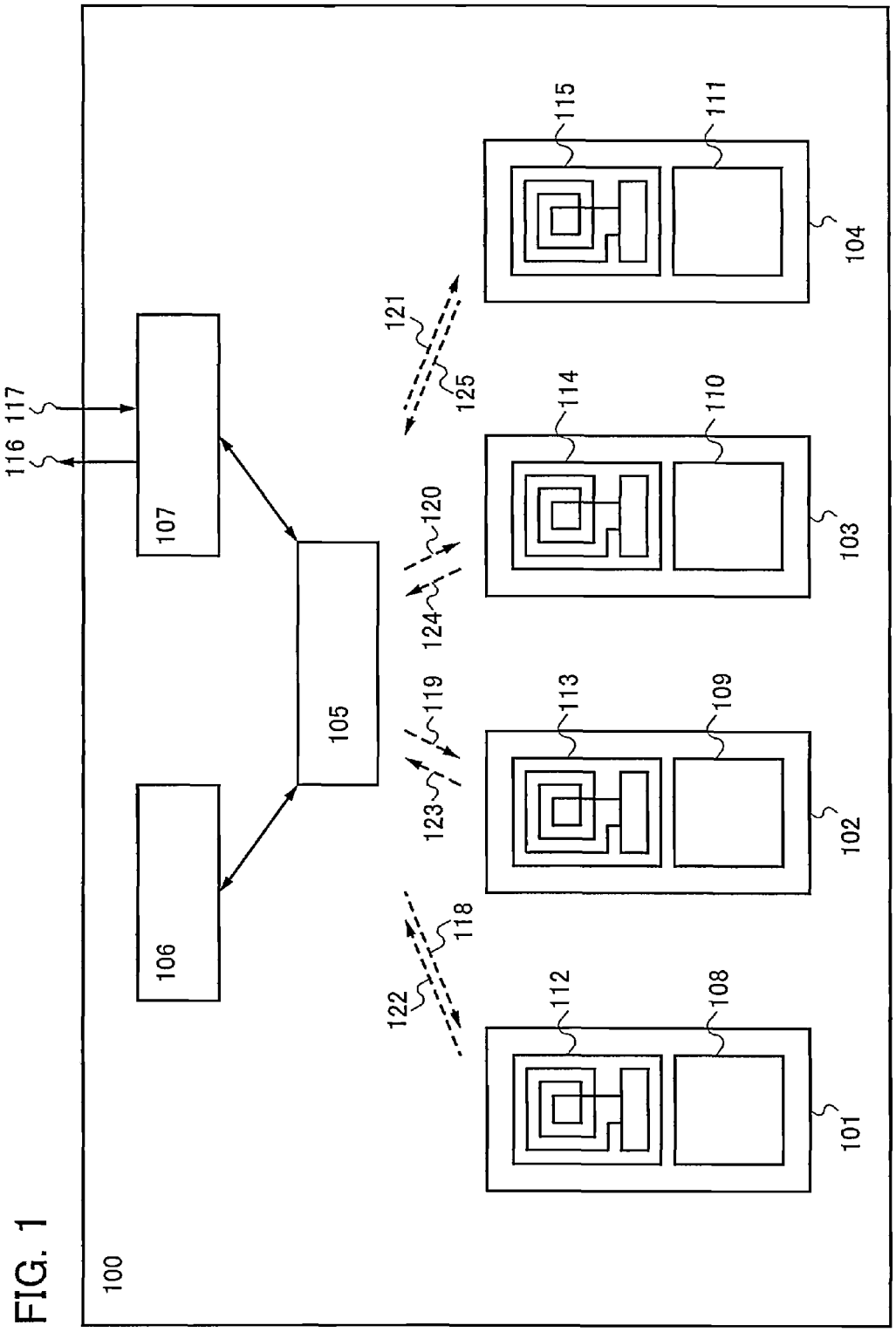
FIG. 1 is a block diagram of a semiconductor device of the present invention.

Embodiment modes of the present invention will be hereinafter described with reference to the accompanying drawings. However, the present invention can be carried out in many different modes, and it is easily understood by those skilled in the art that the mode and detail of the present invention can be modified in various ways without departing from its spirit and scope. Therefore, the present invention is not interpreted as being limited to the description in the embodiment modes. Note that in the drawings illustrating the embodiment modes, the same portions or portions having a similar function are denoted by the same reference numerals, and repetitive explanation thereof is omitted.

Embodiment Mode 1

Figure 2:
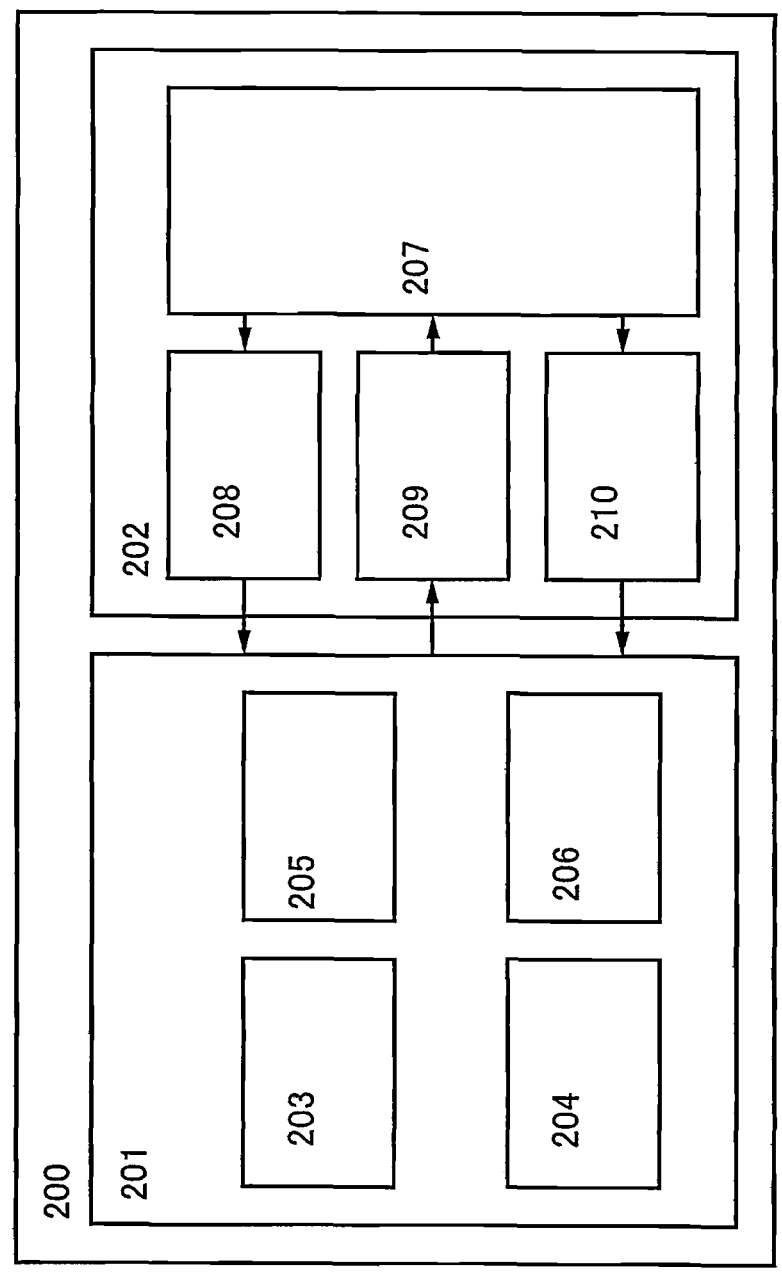
FIG. 2 is a block diagram of a CPU included in a semiconductor device of the present invention.
Figure 3:
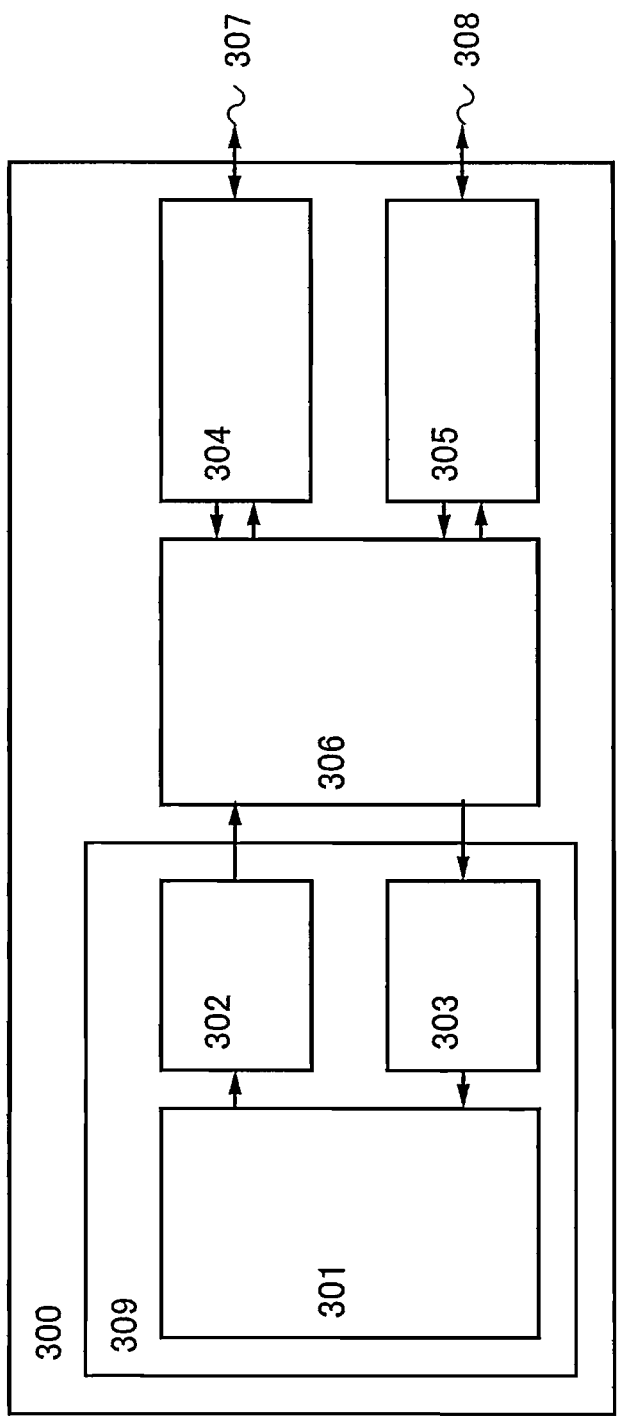
FIG. 3 is a block diagram of a router circuit included in a semiconductor device of the present invention.

Embodiment Mode 1 describes an example of a structure of a semiconductor device of the present invention with reference to FIGS. 1 to 3. FIGS. 1 to 3 are block diagrams of a semiconductor device, a CPU, and a router circuit of this embodiment mode, respectively.

In FIG. 1, a semiconductor device 100 has first to fourth CPUs 101 to 104, a router circuit 105, a thread control circuit 106, and an external device controller 107. The first to fourth CPUs 101 to 104 have first to fourth CPU cores 108 to 111 and first to fourth wireless circuits 112 to 115, respectively. Note that in FIG. 1, the router circuit 105 transmits first to fourth wireless transmission signals 118 to 121 to the first to fourth CPUs 101 to 104, and the first to fourth CPUs 101 to 104 transmit fifth to eighth wireless transmission signals 122 to 125 to the router circuit 105, respectively. The semiconductor device 100 transmits and receives a data signal or a control signal to and from an external device connected to the semiconductor device 100 with the use of an external data output line 116 and an external data input line 117.

Next, a specific structure of CPU is described with reference to FIG. 2. Note that in FIG. 2, a CPU 200 corresponds to each of the first to fourth CPUs 101 to 104 of FIG. 1; a CPU core 201 corresponds to each of the first to fourth CPU cores 108 to 111 of FIG. 1; and a wireless circuit 202 corresponds to each of the first to fourth wireless circuits 112 to 115 of FIG. 1.

The CPU core 201 has a control circuit 203, an arithmetic circuit 204, a cache memory 205, and a general purpose register 206. The control circuit 203 controls the processing in the CPU 200. The arithmetic circuit 204 performs numerical operation and logical operation. The cache memory 205 is a storage device which stores programs processed by the CPU 200 and data necessary for the processing. The general purpose register 206 is used as a storage source of data which are used for numerical operation and logical operation and as a storage destination of operation results. Note that the CPU core 201 can employ an architecture such as a reduced instruction set computer (RISC) or a complex instruction set computer (CISC).

The wireless circuit 202 has an antenna circuit 207, a demodulation circuit 208, a modulation circuit 209, and a power supply circuit 210. The antenna circuit 207 functions to transmit and receive a communication signal. For example, the antenna circuit 207 may be provided with a coil in the case of employing an electromagnetic induction method, or may be provided with a dipole antenna in the case of employing an electric field method. The demodulation circuit 208 functions to extract reception data from a communication signal. For example, the demodulation circuit 208 may be a low-pass filter (LPF). The modulation circuit 209 functions to superimpose transmission data on a communication signal. The power supply circuit 210 functions to generate a power supply voltage for the CPU 200 from a communication signal. For example, the power supply circuit 210 can be formed using a rectifier circuit and a storage capacitor. Although this embodiment mode describes a so-called passive CPU which generates a power supply voltage from a wireless signal received, a so-called active CPU which supplies a power supply voltage from an incorporated battery can also be used. Alternatively, a structure in which a power supply voltage is supplied from a commercial power supply can also be used.

Note that the data transmission from the first to fourth CPUs 101 to 104 to the router circuit 105 is conducted using a modulation method by turning on or off a switch of the modulation circuit, i.e., a backscattering method. As the backscattering method, a phase modulation method or an amplitude modulation method can be used. As a data encoding method, a technique such as a quadrature phase shift keying (QPSK) method, a binary phase shift keying (BPSK) method, or an 8 phase shift keying (8 PSK) method can be used. These modulation methods do not require CPUs themselves to transmit a transmission signal; therefore, these methods can reduce power necessary for the data transmission from the CPUs. Thus, employment of a backscattering method for data transmission from a CPU to reduce power consumption is a feature of the semiconductor device of the present invention.

Here, each of the QPSK method, the BPSK method, and the 8 PSK method is a modulation method for converting digital values into analog signals and is a phase shift keying method for expressing information using a combination of a plurality of waves with phase shifts. With the QPSK method, four-value (2-bit) information can be transmitted or received at a time by using a total of four waves, a reference sine wave and waves with phase shifts of 90°, 180°, and 270°, and by allocating different values to each of them. With the BPSK method, two-value (1-bit) information can be transmitted or received at a time by using a reference sine wave and a wave with an inverted phase and by relating one of them to 0 and the other to 1. With the 8 PSK method, eight-value (3-bit) information can be transmitted or received at a time by using a total of eight waves, a reference sine wave and waves with phase shifts of 45° each and by allocating different values to each of them.

Next, a specific structure of the router circuit is described with reference to FIG. 3. In FIG. 3, a router circuit 300 corresponding to the router circuit 105 of FIG. 1 has an antenna circuit 301, a demodulation circuit 302, a modulation circuit 303, a first bus controller circuit 304, a second bus controller circuit 305, and a data processing circuit 306. The antenna circuit 301, the demodulation circuit 302, and the modulation circuit 303 are collectively referred to as a wireless circuit 309. The antenna circuit 301 functions to transmit and receive a communication signal to and from the CPUs. For example, the antenna circuit 301 may be provided with a coil in the case of employing an electromagnetic induction method, or may be provided with a dipole antenna in the case of employing an electric field method. The demodulation circuit 302 functions to extract reception data from a communication signal. For example, the demodulation circuit 302 may be an LPF. The modulation circuit 303 functions to superimpose transmission data on a communication signal. The first bus controller circuit 304 is connected to the thread control circuit 106 of FIG. 1 through a first bus 307 and functions to control data transmission and reception to and from the thread control circuit 106. The second bus controller circuit 305 is connected to the external device controller 107 of FIG. 1 through a second bus 308 and functions to control data transmission and reception to and from the external device controller 107.

The data processing circuit 306 functions to process and store reception data from the CPUs, transmission data to the CPUs, data input and output through the first bus 307, and data input and output through the second bus 308, and functions to manage and conduct data transmission and reception between the CPUs, between the CPUs and the thread control circuit, and between the CPUs and the external device controller.

As described above, the router circuit 105 can function to mediate data transmission and reception between the first to fourth CPUs 101 to 104 and the thread control circuit 106 or the external device controller 107. For example, when the router circuit 105 receives, from the first CPU 101, transmission data to which the external device controller 107 is designated as a data transmission destination, the router circuit 105 transmits the data to the transmission destination, i.e., the external device controller 107. By employing such a method as described above by which data transmission and reception are mediated by the router circuit 105, there is an advantage that conflict in data transmission and reception between the CPUs, between the CPUs and the thread controller circuit, and between the CPUs and the external device controller hardly occurs even if a plurality of CPUs are provided. In addition, data transmission and reception can be efficiently allocated to the CPU, the thread control circuit, or the external device controller which requires data transmission and reception.

Note that a wireless signal is used for data transmission from the router circuit 105 to the first to fourth CPUs 101 to 104, and a technique such as a time division multiple access (TDMA) method or a code division multiple access (CDMA) method can be employed. Data transmission and reception between the router circuit 105 and the thread control circuit 106 or the external device controller 107 can be conducted using a wireless signal or a wired signal.

Here, the TDMA method is a method in which a single frequency is shared by a plurality of transmitters in turn at short intervals. The CMDA method is a method by which transmission data of a plurality of transmitters are each multiplied by different codes and all transmission data are synthesized and transmitted using a single frequency. A receiver can extract only transmission data of a relevant transmitter by multiplying the synthesized signal with the code of the relevant transmitter.

The thread control circuit 106 functions to allocate processing (a thread) to be executed by a CPU to the CPU. Specifically, the thread control circuit 106 functions to schedule threads with the use of information showing an operation state such as being running or idle, information showing running and idle threads, and information about the order of thread priorities, with respect to the first to fourth CPUs 101 to 104 in the semiconductor device 100. In addition, the thread control circuit 106 functions to allocate information about a CPU assigned to handle processing and data necessary for the processing to a thread to produce thread information and functions to transmit the thread information to the router circuit 105. Note that the thread information is transmitted to the relevant CPU of the first to fourth CPUs 101 to 104 through the router circuit 105 and executed appropriately.

Note that a thread is a unit of processing of a CPU. A normal CPU employs a processing method called multitasking. In this method, a plurality of processes are pseudo-simultaneously executed by temporally changing processes. However, changing processes may require a changing operation with heavy load such as data storing or reading of an internal register of a CPU. A thread is a process which is divided so that a changing process is not needed. In other words, the division of processing into threads enables efficient multitasking.

The external device controller 107 functions to transmit and receive a data signal or a control signal between the semiconductor device 100 and an external device connected to the semiconductor device 100, with the use of the external data output line 116 and the external data input line 117. For example, when the semiconductor device 100 is connected to an external dynamic random access memory (DRAM), the external device controller 107 functions as a DRAM controller. When the semiconductor device 100 is connected to an external peripheral device having a PCI bus, the external device controller 107 functions as a PCI bus controller. When the semiconductor device 100 is connected to an external universal serial bus (USB), the external device controller 107 functions as a USB controller. In addition, the external device controller 107 functions to transmit and receive data to and from the router circuit 105.

In the operation of the semiconductor device 100, for example, if the first CPU 101 executes an instruction to generate a new thread, the first CPU 101 transmits an instruction requiring generation of a thread to the thread control circuit 106 through the router circuit 105. The thread control circuit 106 determines a CPU, to which the thread is to be allocated, from idle CPUs or CPUs executing threads with low priority, and transmits thread information including an address of an instruction to be executed to the CPU through the router circuit. Thus, the thread control circuit 106 has a function to allocate a thread to a relevant CPU, i.e., a scheduling function.

In a semiconductor device with a normal multiprocessor structure, allocation of a thread to a relevant CPU is carried out by software with the use of a thread scheduling function of an operating system (OS) corresponding to a multiprocessor. However, the scheduling function itself is achieved by a thread; therefore, a CPU is used. Thus, operation performance of the semiconductor device as a whole is lowered.

On the other hand, the semiconductor device of the present invention can realize thread scheduling without lowering the arithmetic processing performance of a CPU by provision of a thread control circuit having a thread scheduling function. Thus, the semiconductor device of the present invention can realize thread scheduling without lowering the operation performance of a CPU.

As described above, by provision of a plurality of CPUs which use a backscattering method of a wireless signal for data transmission, a router circuit which mediates data transmission and reception between CPUs or the like, and a thread control circuit which has a thread scheduling function, a semiconductor device which consumes less power and has high arithmetic performance can be provided at low cost.

Embodiment Mode 2

Figure 4:
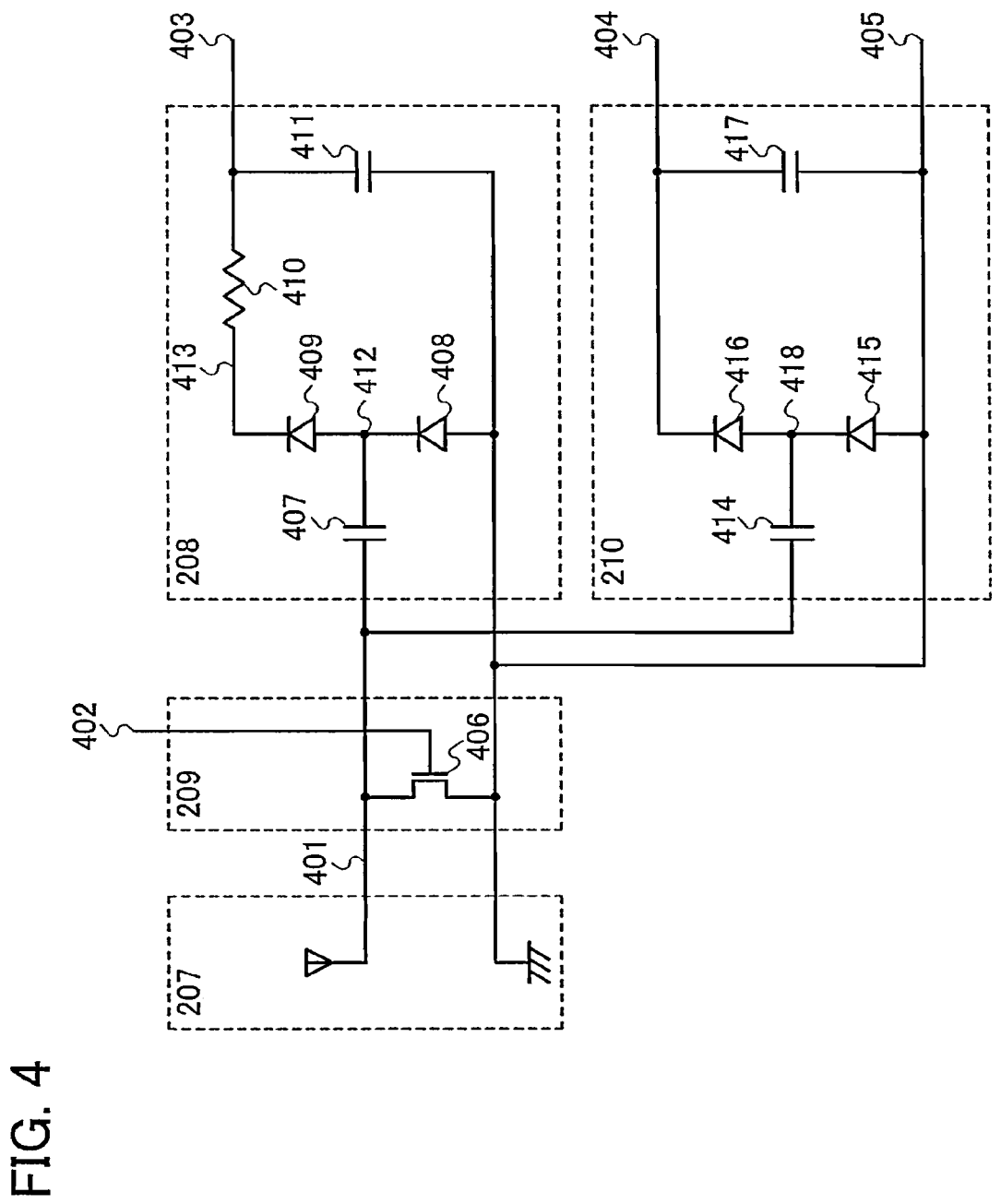
FIG. 4 shows a structure of a wireless circuit of a CPU included in a semiconductor device of the present invention.

Embodiment Mode 2 describes the structure of the wireless circuit of the CPU in the above embodiment mode with reference to FIG. 4. FIG. 4 shows a case where the wireless circuit has the antenna circuit 207, the demodulation circuit 208, the modulation circuit 209, and the power supply circuit 210.

In FIG. 4, the modulation circuit 209 has a transistor 406 and can superimpose transmission data on a communication signal by changing the potential of a modulation signal line 402.

The demodulation circuit 208 has a first coupling capacitor 407, a first diode 408, a second diode 409, an LPF resistor 410, and an LPF capacitor 411. A first AC voltage obtained from a communication signal by the antenna circuit 207 is supplied through a wiring 401 and converted into a second AC voltage by the first coupling capacitor 407, and the second AC voltage is supplied to a wiring 412. The second AC voltage is converted into a DC voltage by a rectifier circuit which has the first diode 408 and the second diode 409, and the DC voltage is supplied to a wiring 413. The DC voltage is converted into a demodulated signal by an LPF which has the LPF resistor 410 and the LPF capacitor 411, and the demodulated signal is supplied to a demodulation signal line 403.

The power supply circuit 210 has a second coupling capacitor 414, a third diode 415, a fourth diode 416, and a storage capacitor 417. The first AC voltage obtained from a communication signal by the antenna circuit 207 is supplied through the wiring 401 and converted into a third AC voltage by the second coupling capacitor 414, and the third AC voltage is supplied to a wiring 418. The third AC voltage is converted into a power supply signal by a rectifier circuit which has the third diode 415 and the fourth diode 416, and the power supply signal is supplied to a power supply wiring 404. The power supply signal is smoothed by the storage capacitor 417. Note that a ground signal is supplied through a ground wiring 405.

As described above, by provision of a wireless circuit which enables wireless data transmission and reception in a CPU and by performing data transmission and reception between CPUs or the like with the use of a backscattering method of a wireless signal through a router, a semiconductor device which consumes less power and has high arithmetic performance can be provided at low cost.

Note that this embodiment mode can be combined with any of structures of semiconductor devices described in the other embodiment modes of this specification.

Embodiment Mode 3

Figure 5:
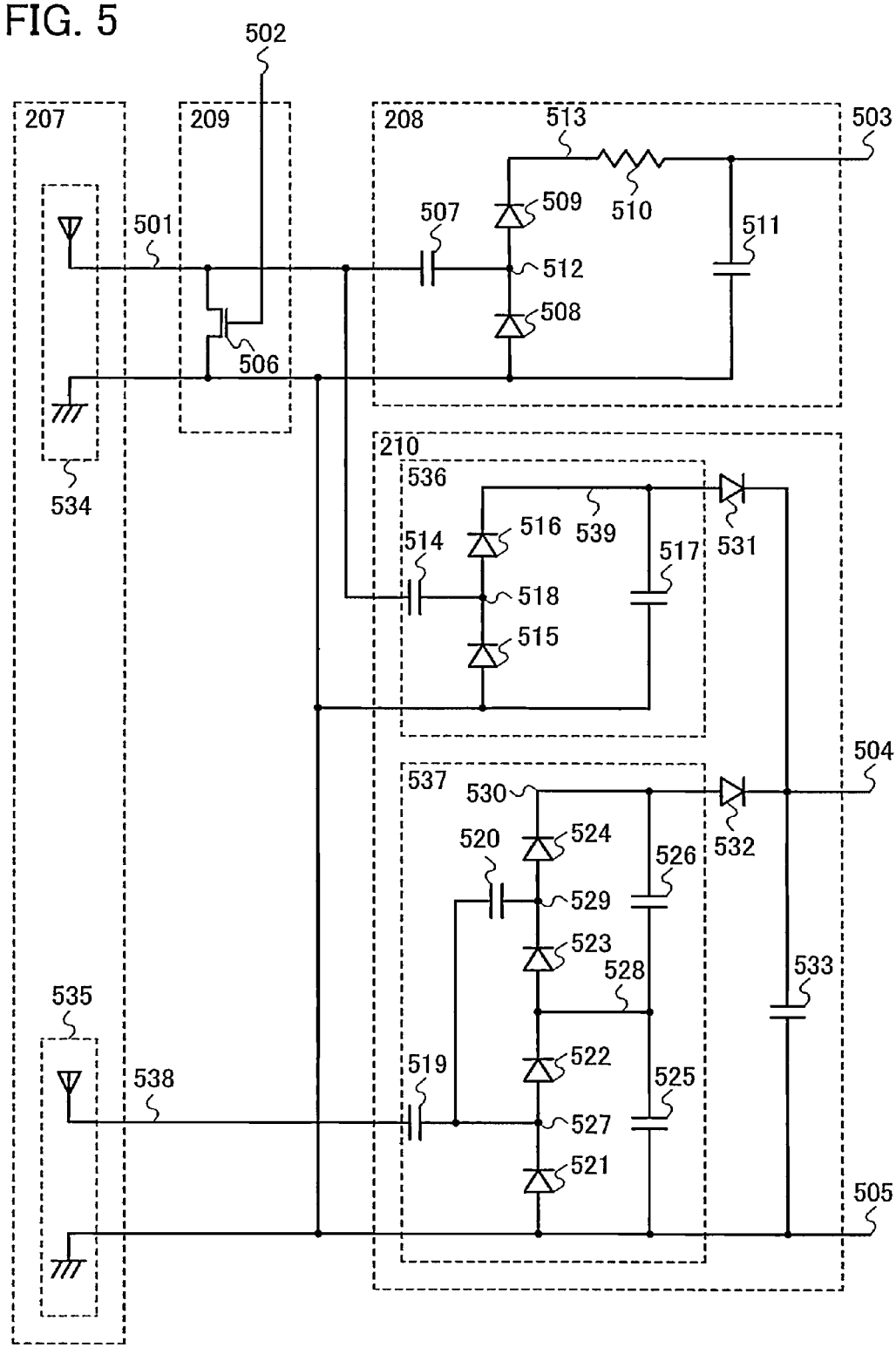
FIG. 5 shows a structure of a wireless circuit of a CPU included in a semiconductor device of the present invention.

Embodiment Mode 3 describes a structure of a wireless circuit of a CPU, which is different from that of Embodiment Mode 2, with reference to FIG. 5.

In FIG. 5, the antenna circuit 207 has a first antenna 534 and a second antenna 535. The first antenna 534 is used for data transmission and reception with a first communication signal and for generation of a first power supply voltage from the first communication signal. The second antenna 535 is used for generation of a second power supply voltage from a second communication signal.

The modulation circuit 209 has a transistor 506 and can superimpose transmission data on the first communication signal by changing the potential of a modulation signal line 502.

The demodulation circuit 208 has a first coupling capacitor 507, a first diode 508, a second diode 509, an LPF resistor 510, and an LPF capacitor 511. A first AC voltage obtained from the first communication signal by the first antenna 534 is supplied through a wiring 501 and converted into a second AC voltage by the first coupling capacitor 507, and the second AC voltage is supplied to a wiring 512. The second AC voltage is converted into a first DC voltage by a rectifier circuit which has the first diode 508 and the second diode 509, and the first DC voltage is supplied to a wiring 513. The first DC voltage is converted into a demodulated signal by an LPF which has the LPF resistor 510 and the LPF capacitor 511, and the demodulated signal is supplied to a demodulation signal line 503.

The power supply circuit 210 has a first power supply circuit 536 and a second power supply circuit 537. The first power supply circuit 536 has a second coupling capacitor 514, a third diode 515, a fourth diode 516, and a first storage capacitor 517. The first AC voltage obtained from the first communication signal by the first antenna 534 is supplied through the wiring 501 and converted into a third AC voltage by the second coupling capacitor 514, and the third AC voltage is supplied to a wiring 518. The third AC voltage is converted into a first power supply signal by a rectifier circuit which has the third diode 515 and the fourth diode 516, and the first power supply signal is supplied to a first power supply wiring 539. The first power supply signal is smoothed by the first storage capacitor 517.

The second power supply circuit 537 has a third coupling capacitor 519, a fourth coupling capacitor 520, fifth to eighth diodes 521 to 524, a second storage capacitor 525, and a third storage capacitor 526. A fourth AC voltage obtained from the second communication signal by the second antenna 535 is supplied through a wiring 538 and converted into a fifth AC voltage by the third coupling capacitor 519, and the fifth AC voltage is supplied to a wiring 527. The fifth AC voltage is converted into a second DC voltage by a rectifier circuit which has the fifth diode 521 and the sixth diode 522, and the second DC voltage is supplied to a wiring 528. The second DC voltage is smoothed by the second storage capacitor 525.

In addition, the fifth AC voltage is converted into a sixth AC voltage by the fourth coupling capacitor 520, and the sixth AC voltage is supplied to a wiring 529. The sixth AC voltage is converted into a third DC voltage by a rectifier circuit which has the seventh diode 523 and the eighth diode 524, and the third DC voltage is supplied to a second power supply wiring 530 as a second power supply signal. The second power supply signal is smoothed by the third storage capacitor 526. Note that the second power supply signal is increased to a high potential when added to a potential accumulated in the second storage capacitor 525.

With a ninth diode 531 and a tenth diode 532, a power supply signal with a higher potential of the first power supply signal and the second power supply signal is supplied to a power supply wiring 504 as a power supply voltage. Note that the power supply voltage is smoothed by a fourth storage capacitor 533. Note also that a ground signal is supplied through a ground wiring 505. The fourth storage capacitor 533 can be a capacitor such as an electric double layer capacitor. Instead of a capacitor, the fourth storage capacitor 533 may be a secondary battery such as a lithium battery, preferably a lithium polymer battery using a gel electrolyte, or a lithium-ion battery.

Here, the second power supply circuit 537 is a step-up circuit. Thus, it is possible to supply a power supply voltage sufficient for operating a CPU even when the second communication signal is weak. In other words, continuous supply of weak second communication signal enables a CPU to continue its operation even if the first communication signal is supplied only when the CPU conducts wireless communication and the first communication signal is stopped from being supplied when the CPU does not conduct wireless communication. Accordingly, wireless communication with a CPU can be achieved with less power consumption.

As described above, by provision, in a CPU, of a wireless circuit enabling wireless data transmission and reception and a step-up circuit generating a certain power even if it receives a weak signal and by performing data transmission and reception between CPUs or the like with the use of a backscattering method of a wireless signal through a router, a semiconductor device which consumes less power and has high arithmetic performance can be provided at low cost.

Note that this embodiment mode can be combined with any of structures of the semiconductor devices described in the other embodiment modes of this specification.

Embodiment Mode 4

Embodiment Mode 4 describes an example of a method for manufacturing the semiconductor device described in the above embodiment modes with reference to drawings. This embodiment mode describes a structure in which an antenna circuit and a power supply circuit in a CPU of the semiconductor device are formed using thin film transistors over the same substrate. It is to be noted that when an antenna circuit and a power supply circuit are formed at a time over the same substrate, reduction in size of the semiconductor device can be achieved, which is advantageous. In addition, this embodiment mode describes an example in which a thin-film secondary battery is used as a storage capacitor in the power supply circuit. Needless to say, instead of the secondary battery, a capacitor such as an electric double layer capacitor may be used.

First, a peeling layer 1303 is formed over one surface of a substrate 1301 with an insulating film 1302 interposed therebetween, and then an insulating film 1304 functioning as a base film and a semiconductor film (e.g., a film containing amorphous silicon) 1305 are stacked thereover (see FIG. 6A). It is to be noted that the insulating film 1302, the peeling layer 1303, the insulating film 1304, and the semiconductor film 1305 can be formed consecutively.

The substrate 1301 is selected from a glass substrate, a quartz substrate, a metal substrate (e.g., a ceramic substrate or a stainless steel substrate), a semiconductor substrate such as a Si substrate, and the like. Alternatively, a plastic substrate made of polyethylene terephthalate (PET), polyethylene naphthalate (PEN), polyether sulfone (PES), acrylic, or the like can be used. In this process, although the peeling layer 1303 is provided over the entire surface of the substrate 1301 with the insulating film 1302 interposed therebetween, the peeling layer 1303 can also be selectively formed by photolithography after being provided over the entire surface of the substrate 1301.

The insulating films 1302 and 1304 are formed using insulating materials such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when each of the insulating films 1302 and 1304 is formed to have a two-layer structure, a silicon nitride oxide film may be formed as a first insulating film and a silicon oxynitride film may be formed as a second insulating film. In addition, a silicon nitride film may be formed as a first insulating film and a silicon oxide film may be formed as a second insulating film. The insulating film 1302 functions as a blocking layer which prevents an impurity element contained in the substrate 1301 from getting mixed into the peeling layer 1303 or elements formed thereover. The insulating film 1304 functions as a blocking layer which prevents an impurity element contained in the substrate 1301 or the peeling layer 1303 from getting mixed into elements formed over the insulating film 1304. In this manner, providing the insulating films 1302 and 1304 which function as the blocking layers can prevent adverse effects on the elements formed over the peeling layer 1303 or the insulating film 1304, which would otherwise be caused by an alkali metal such as Na or an alkaline earth metal contained in the substrate 1301 or by the impurity element contained in the peeling layer 1303. It is to be noted that when quartz is used for the substrate 1301, for example, the insulating film 1302 may be omitted.

The peeling layer 1303 may be formed using a metal film, a stacked structure of a metal film and a metal oxide film, or the like. As a metal film, either a single layer or stacked layers is/are formed using an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing such an element as its main component. In addition, such materials can be formed by a sputtering method, various CVD methods such as a plasma CVD method, or the like. A stacked structure of a metal film and a metal oxide film can be obtained by the steps of forming the above-described metal film, applying plasma treatment thereto under an oxygen atmosphere or an $N_2O$ atmosphere or applying heat treatment thereto under an oxygen atmosphere or an $N_2O$ atmosphere, and thereby forming oxide or oxynitride of the metal film on the surface of the metal film. For example, when a tungsten film is provided as a metal film by a sputtering method, a CVD method, or the like, a metal oxide film of tungsten oxide can be formed on the surface of the tungsten film by application of plasma treatment to the tungsten film. When tungsten oxide is formed, there is no particular limitation on the amount of oxygen, and thus, which of the above oxides is to be formed may be determined based on the etching rate or the like. In addition, after a metal film (e.g., tungsten) is formed, an insulating film formed of silicon oxide ($SiO_2$) or the like may be formed over the metal film by a sputtering method, and also metal oxide (e.g., tungsten oxide on tungsten) may be formed on the metal film. Moreover, high-density-plasma treatment as described above may be applied as the plasma treatment, for example. Besides, metal nitride or metal oxynitride may also be formed. In that case, plasma treatment or heat treatment may be applied to the metal film under a nitrogen atmosphere or an atmosphere containing nitrogen and oxygen.

The amorphous semiconductor film 1305 is formed with a thickness of 25 to 200 nm (preferably, 30 to 150 nm) by a sputtering method, an LPCVD method, a plasma CVD method, or the like.

Next, the amorphous semiconductor film 1305 is crystallized by laser irradiation. Alternatively, the crystallization of the amorphous semiconductor film 1305 may be performed by a method combining the laser crystallization with a thermal crystallization method using RTA or an annealing furnace or with a thermal crystallization method using a metal element that promotes the crystallization. After that, the crystallized semiconductor film is etched into a desired shape, whereby crystalline semiconductor films 1305a to 1305f are formed. Then, a gate insulating film 1306 is formed so as to cover the semiconductor films 1305a to 1305f (see FIG. 6B).

The gate insulating film 1306 is formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when the gate insulating film 1306 is formed to have a two-layer structure, it is preferable to form a silicon oxynitride film as a first insulating film and form a silicon nitride oxide film as a second insulating film. Alternatively, it is also preferable to form a silicon oxide film as a first insulating film and form a silicon nitride film as a second insulating film.

An example of a formation process of the crystalline semiconductor films 1305a to 1305f is briefly explained below. First, an amorphous semiconductor film with a thickness of 50 to 60 nm is formed by a plasma CVD method. Then, a solution containing nickel which is a metal element that promotes crystallization is retained on the amorphous semiconductor film, which is followed by dehydrogenation treatment (500° C. for one hour) and thermal crystallization treatment (550° C. for four hours). Thus, a crystalline semiconductor film is formed. Then, the crystalline semiconductor film is subjected to laser irradiation and then a photolithography process to form the crystalline semiconductor films 1305a to 1305f. It is to be noted that crystallization of the amorphous semiconductor film may be performed only by laser irradiation, not by thermal crystallization which uses a metal element that promotes crystallization.

As a laser oscillator used for crystallization, either a continuous wave laser oscillator (a CW laser oscillator) or a pulsed laser oscillator can be used. As a laser that can be used here, there are a gas laser such as an Ar laser, a Kr laser, or an excimer laser; a laser whose medium is single-crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. When irradiation is performed with the fundamental wave of such a laser beam or the second to fourth harmonics of such a laser beam, crystals with a large grain size can be obtained. For example, the second harmonic (532 nm) or the third harmonic (355 nm) of an Nd:$YVO_4$ laser (the fundamental wave of 1064 nm) can be used. In this case, a laser power density of approximately 0.01 to 100 MW/cm² (preferably, 0.1 to 10 MW/cm²) is needed, and irradiation is performed with a scanning rate of approximately 10 to 2000 cm/sec. It is to be noted that the laser whose medium is single crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ doped with one or more of Nd, Yb, Cr, Ti, Ho, Er, Tm, and Ta as a dopant; an Ar ion laser, or a Ti:sapphire laser can be used as a CW laser, whereas it can also be used as a pulsed laser with a repetition rate of 10 MHz or more by a Q-switch operation, mode locking, or the like. When a laser beam with a repetition rate of 10 MHz or more is used, a semiconductor film is irradiated with the next pulse during the period in which the semiconductor film has been melted by the laser beam and is solidified. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 1306 may be formed by oxidization or nitridation of the surfaces of the semiconductor films 1305a to 1305f by the above-described high-density plasma treatment. For example, plasma treatment with a mixed gas of a rare gas such as He, Ar, Kr, or Xe, and oxygen, nitrogen oxide ($NO_2$), ammonia, nitrogen, or hydrogen is conducted. When plasma is excited by the introduction of microwaves, plasma with a low electron temperature and high density can be generated. With oxygen radicals (which may include OH radicals) or nitrogen radicals (which may include NH radicals) which are generated by the high-density plasma, a surface of a semiconductor film can be oxidized or nitrided.

By such high-density plasma treatment, an insulating film with a thickness of 1 to 20 nm, typically 5 to 10 nm, is formed on a semiconductor film. Since the reaction in this case is a solid-phase reaction, the interface state density between the insulating film and the semiconductor film can be quite low. Since such high-density plasma treatment directly oxidizes (or nitrides) a semiconductor film (crystalline silicon or polycrystalline silicon), desirably, an insulating film can be formed with extremely little unevenness. In addition, since crystal grain boundaries of crystalline silicon are not strongly oxidized, an excellent state is obtained. That is, by the solid-phase oxidation of a surface of a semiconductor film by high-density plasma treatment which is described in this embodiment mode, an insulating film with a uniform thickness and low interface state density can be formed without excessive oxidation reaction at the crystal grain boundaries.

As the gate insulating film, only an insulating film formed by high-density plasma treatment may be used, or a stacked layer may be employed, which is obtained by deposition of an insulating film such as silicon oxide, silicon oxynitride, or silicon nitride on the insulating film, by a CVD method using plasma or thermal reaction. In either case, a transistor which includes such an insulating film formed by high-density plasma treatment in a part or the whole of its gate insulating film can have reduced characteristic variations.

In addition, the semiconductor films 1305a to 1305f, which are obtained by irradiation of a semiconductor film with a continuous wave laser beam or a laser beam oscillated with a repetition rate of 10 MHz or more and scanning the semiconductor film with the laser beam in one direction to crystallize the semiconductor film, have a characteristic in that their crystals grow in the beam scanning direction. Transistors are each arranged so that its channel length direction (direction in which carriers move when a channel formation region is formed) is aligned with the scanning direction, and the above-described gate insulating film is combined with the semiconductor film, whereby thin film transistors (TFTs) with high electron field effect mobility and reduced variations in characteristics can be obtained.

Next, a first conductive film and a second conductive film are stacked over the gate insulating film 1306. Here, the first conductive film is formed to a thickness of 20 to 100 nm by a CVD method, a sputtering method, or the like. The second conductive film is formed to a thickness of 100 to 400 nm. The first conductive film and the second conductive film are formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing such an element as its main component. Alternatively, a semiconductor material typified by polycrystalline silicon doped with an impurity element such as phosphorus can also be used. As combination examples of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, heat treatment for the purpose of thermal activation can be applied thereto. In addition, in the case where a two-layer structure is not employed, but a three-layer structure is employed, it is preferable to use a stacked structure of a molybdenum film, an aluminum film, and a molybdenum film.

Next, a resist mask is formed by photolithography, and etching treatment is conducted to form gate electrodes and gate lines. Thus, gate electrodes 1307 are formed above the semiconductor films 1305a to 1305f. Here, a stacked structure of a first conductive film 1307a and a second conductive film 1307b is shown as an example of the gate electrode 1307.

Next, the semiconductor films 1305a to 1305f are doped with an n-type impurity element at low concentration, using the gate electrodes 1307 as masks by an ion doping method or an ion implantation method. Then, a resist mask is selectively formed by photolithography, and the semiconductor films 1305c and 1305e are doped with a p-type impurity element at high concentration. As an n-type impurity element, phosphorus (P), arsenic (As), or the like can be used. As a p-type impurity element, boron (B), aluminum (Al), gallium (Ga), or the like can be used. Here, phosphorus (P) is used as an n-type impurity element and is selectively introduced into the semiconductor films 1305a to 1305f so as to be contained at concentrations of $1 \times 10^{15}$ to $1 \times 10^{19}/cm^3$. Thus, n-type impurity regions 1308 are formed. In addition, boron (B) is used as a p-type impurity element, and is selectively introduced into the semiconductor films 1305c and 1305e so as to be contained at concentrations of $1 \times 10^{19}$ to $1 \times 10^{20}/cm^3$. Thus, p-type impurity regions 1309 are formed (see FIG. 6C).

Subsequently, an insulating film is formed so as to cover the gate insulating film 1306 and the gate electrodes 1307. The insulating film is formed using either a single layer or a stacked layer of a film containing an inorganic material such as silicon, silicon oxide, or silicon nitride, or a film containing an organic material such as an organic resin by a plasma CVD method, a sputtering method, or the like. Next, the insulating film is selectively etched by anisotropic etching mainly in the perpendicular direction, so that insulating films 1310 (also referred to as sidewalls) which are in contact with the side surfaces of the gate electrodes 1307 are formed. The insulating films 1310 are used as masks in doping for forming LDD (Lightly Doped Drain) regions.

Next, the semiconductor films 1305a, 1305b, 1305d, and 1305f are doped with an n-type impurity element at high concentration, using resist masks formed by photolithography, the gate electrodes 1307, and the insulating films 1310 as masks. Thus, n-type impurity regions 1311 are formed. Here, phosphorus (P) is used as an n-type impurity element, and is selectively introduced into the semiconductor films 1305a, 1305b, 1305d, and 1305f so as to be contained at concentrations of $1 \times 10^{19}$ to $1 \times 10^{20}/cm^3$. Thus, the n-type impurity regions 1311 with higher concentration of impurity than that of the impurity regions 1308 are formed.

Through the above steps, n-channel thin film transistors 1300*a*, 1300*b*, 1300*d*, and 1300*f*, and p-channel thin film transistors 1300*c* and 1300*e* are formed (see FIG. 6D).

In the n-channel thin film transistor 1300*a*, a channel formation region is formed in a region of the semiconductor film 1305*a* which overlaps with the gate electrode 1307; the impurity regions 1311 serving as source and drain regions are formed in regions of the semiconductor film 1305*a* which do not overlap with the gate electrode 1307 and the insulating film 1310; and low concentration impurity regions (LDD regions) are formed in regions of the semiconductor film 1305*a* which overlap with the insulating film 1310, between the channel formation region and the impurity regions 1311. Similarly, channel formation regions, low concentration impurity regions, and the impurity regions 1311 are formed in the n-channel thin film transistors 1300*b*, 1300*d*, and 1300*f*.

In the p-channel thin film transistor 1300*c*, a channel formation region is formed in a region of the semiconductor film 1305*c* which overlaps with the gate electrode 1307, and the impurity regions 1309 serving as source and drain regions are formed in regions of the semiconductor film 1305*c* which do not overlap with the gate electrode 1307. Similarly, a channel formation region and the impurity regions 1309 are formed in the p-channel thin film transistor 1300*e*. Here, although LDD regions are not formed in the p-channel thin film transistors 1300*c* and 1300*e*, LDD regions may be provided in the p-channel thin film transistors or a structure without LDD regions may be applied to the n-channel thin film transistors.

Next, an insulating film with a single layer structure or a stacked layer structure is formed so as to cover the semiconductor films 1305*a* to 1305*f*, the gate electrodes 1307, and the like. Then, conductive films 1313 electrically connected to the impurity regions 1309 and 1311 which serve as the source and drain regions of the thin film transistors 1300*a* to 1300*f* are formed over the insulating film (see FIG. 7A). The insulating film is formed with a single layer or a stacked layer, using an inorganic material such as silicon oxide or silicon nitride, an organic material such as polyimide, polyamide, benzocyclobutene, acrylic, or epoxy, a siloxane material, or the like by a CVD method, a sputtering method, an SOG method, a droplet discharging method, a screen printing method, or the like. In this embodiment mode, the insulating film is formed to have a two-layer structure, and a silicon nitride oxide film is formed as a first insulating film 1312*a* and a silicon oxynitride film is formed as a second insulating film 1312*b*. In addition, the conductive films 1313 can form the source and drain electrodes of the thin film transistors 1300*a* to 1300*f*.

Before the insulating films 1312*a* and 1312*b* are formed or after one or both of the insulating films 1312*a* and 1312*b* is/are formed, heat treatment is preferably conducted for recovery of the crystallinity of the semiconductor films, activation of the impurity element which has been added into the semiconductor films, or hydrogenation of the semiconductor films. As the heat treatment, thermal annealing, laser annealing, RTA, or the like may be applied.

The conductive films 1313 are formed with a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. The conductive films 1313 are preferably formed to have a stacked structure of a barrier film, an aluminum silicon (Al—Si) film, and a barrier film or a stacked structure of a barrier film, an aluminum silicon (Al—Si) film, a titanium nitride film, and a barrier film. Note that the "barrier film" corresponds to a thin film formed of titanium, titanium nitride, molybdenum, or molybdenum nitride. Aluminum and aluminum silicon are suitable materials for forming the conductive films 1313 because they have low resistance value and are inexpensive. When barrier layers are provided as the top layer and the bottom layer, generation of hillocks of aluminum or aluminum silicon can be prevented. In addition, when a barrier film is formed of titanium which is an element having a high reducing property, even if a thin natural oxide film is formed on the crystalline semiconductor film, the natural oxide film can be reduced, and a favorable contact between the conductive film 1313 and the crystalline semiconductor film can be obtained.

Next, an insulating film 1314 is formed so as to cover the conductive films 1313, and conductive films 1315*a* and 1315*b* electrically connected to the conductive films 1313 which form the source electrodes or the drain electrodes of the thin film transistors 1300*a* and 1300*f* are formed over the insulating film 1314. In addition, a conductive film 1316 electrically connected to the conductive film 1313 which forms the source electrode or drain electrode of the thin film transistor 1300*b* is formed. It is to be noted that the conductive films 1315*a* and 1315*b* and the conductive film 1316 may be formed using the same material at the same time. The conductive films 1315*a* and 1315*b* and the conductive film 1316 can be formed using any of the above-described materials for the conductive film 1313.

Next, a conductive film 1317 functioning as an antenna is formed so as to be electrically connected to the conductive film 1316 (see FIG. 7B).

The insulating film 1314 can be formed with a single layer or a stacked layer of an insulating film containing oxygen and/or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like. It is to be noted that a siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. In addition, a fluoro group may be used as the substituent. Further, both a fluoro group and an organic group containing at least hydrogen may be used as the substituent.

The conductive film 1317 is formed of a conductive material by a CVD method, a sputtering method, a printing method such as screen printing or gravure printing, a droplet discharging method, a dispenser method, a plating method, or the like. The conductive film 1317 is formed with a single layer or a stacked layer of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as its main component.

For example, when the conductive film 1317 functioning as an antenna is formed by a screen printing method, the conductive film 1317 can be provided by selective printing of a conductive paste in which conductive particles with a grain diameter of several nanometers to several tens of micrometers are dissolved or dispersed in an organic resin. The conductive particles can be at least one or more of metal particles selected from silver (Ag), gold (Au), copper (Cu), nickel (Ni), platinum (Pt), palladium (Pd), tantalum (Ta), molybdenum (Mo), titanium (Ti), and the like; fine particles of silver halide; and dispersive nanoparticles thereof. In addition, the organic resin included in the conductive paste can be one or more of organic resins which function as a binder, a solvent, a dispersing agent, and a coating material of the metal particles. Typically, organic resins such as an epoxy resin and a silicone resin can be given as examples. Preferably, a conductive paste is extruded and then baked to form the conductive film. For example, in the case of using fine particles (e.g., a grain diameter of 1 to 100 nm) containing silver as its main component as a material of the conductive paste, the conductive paste is baked and hardened at temperatures of 150 to 300° C., so that the conductive film can be obtained. Alternatively, it is also possible to use fine particles containing solder or lead-free solder as its main component. In that case, fine particles with a grain diameter of 20 μm or less are preferably used. Solder and lead-free solder have the advantage of low cost.

The conductive films 1315*a* and 1315*b* can function as wirings which are electrically connected to a secondary battery included in the semiconductor device of the present invention in a later step. In addition, in forming the conductive film 1317 which functions as an antenna, other conductive films may be separately formed so as to be electrically connected to the conductive films 1315*a* and 1315*b*, so that the conductive films can be utilized as the wirings for connecting the conductive films 1315*a* and 1315*b* to the secondary battery.

Next, after forming an insulating film 1318 so as to cover the conductive film 1317, a layer including the thin film transistors 1300*a* to 1300*f*, the conductive film 1317, and the like (hereinafter referred to as an "element formation layer 1319") is peeled off the substrate 1301. Here, after forming opening portions in the element formation layer 1319 excluding the region of the thin film transistors 1300*a* to 1300*f* by laser irradiation (e.g., with UV light) (see FIG. 7C), the element formation layer 1319 can be peeled off the substrate 1301 with a physical force. The peeling layer 1303 may be selectively removed by introduction of an etchant into the opening portions before peeling the element formation layer 1319 off the substrate 1301. As the etchant, a gas or a liquid containing halogen fluoride or an interhalogen compound is used. For example, when chlorine trifluoride ($ClF_3$) is used as the gas containing halogen fluoride, the element formation layer 1319 is peeled off the substrate 1301. The whole peeling layer 1303 does not necessarily be removed but part thereof may be left. Accordingly, the consumption of the etchant can be suppressed and process time needed for removing the peeling layer can be shortened. In addition, even after removing the peeling layer 1303, the element formation layer 1319 can be held above the substrate 1301. In addition, by reuse of the substrate 1301 from which the element formation layer 1319 has been peeled, cost reduction can be achieved.

The insulating film 1318 can be formed with a single layer or a stacked layer of an insulating film containing oxygen and/or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like.

In this embodiment mode, after forming the opening portions in the element formation layer 1319 by laser irradiation, a first sheet material 1320 is attached to one surface of the element formation layer 1319 (the surface where the insulating film 1318 is exposed), and then the element formation layer 1319 is peeled off the substrate 1301 (see FIG. 8A).

Next, a second sheet material 1321 is provided for the other surface of the element formation layer 1319 (the surface exposed by peeling), followed by one or both of heat treatment and pressurization treatment for attachment of the second sheet material 1321 (see FIG. 8B). The first sheet material 1320 and the second sheet material 1321 functions as substrates, and a plastic film such as a hot-melt film can be used. In addition, without being limited to such plastic films, a substrate having an insulating surface, such as a glass substrate, can be used.

As the first sheet material 1320 and the second sheet material 1321, a film on which antistatic treatment for preventing static electricity or the like has been applied (hereinafter referred to as an antistatic film) can also be used. As examples of the antistatic film, a film in which an antistatic material is dispersed in a resin, a film to which an antistatic material is attached, and the like can be given. The film provided with an antistatic material can be a film with an antistatic material provided on one of its surfaces, or a film with an antistatic material provided on each of its surfaces. The film with an antistatic material provided on one of its surfaces may be attached to the layer so that the antistatic material is placed on the inner side of the film or the outer side of the film. The antistatic material may be provided over the entire surface of the film, or over a part of the film. As an antistatic material, a metal, indium tin oxide (ITO), or a surfactant such as an amphoteric surfactant, a cationic surfactant, or a nonionic surfactant can be used. Further, as an antistatic material, a resin material which contains a cross-linked copolymer having a carboxyl group and a quaternary ammonium base on its side chain, or the like can be used. Such a material is attached, mixed, or applied to a film, so that an antistatic film can be formed. The element formation layer is sealed using the antistatic film, so that the semiconductor elements can be protected from adverse effects such as external static electricity when dealt with as a commercial product.

It is to be noted that a thin-film secondary battery is connected to the conductive films 1315*a* and 1315*b*, so that the storage capacitor of the power supply circuit is formed. The connection with the secondary battery may be conducted before the element formation layer 1319 is peeled off the substrate 1301 (at the stage shown in FIG. 7B or FIG. 7C), after the element formation layer 1319 is peeled off the substrate 1301 (at the stage shown in FIG. 8A), or after the element formation layer 1319 is sealed with the first sheet material 1320 and the second sheet material 1321 (at the stage shown in FIG. 8B). An example where the element formation layer 1319 and the secondary battery are formed to be connected is explained below with reference to FIGS. 9A and 9B and FIGS. 10A and 10B.

At the stage shown in FIG. 7B, conductive films 1331*a* and 1331*b* which are electrically connected to the conductive films 1315*a* and 1315*b*, respectively are formed at the same time as the conductive film 1317 which functions as an antenna. Then, the insulating film 1318 is formed so as to cover the conductive films 1317, 1331*a*, and 1331*b*, followed by formation of opening portions so that the surfaces of the conductive films 1331*a* and 1331*b* are exposed. After that, the opening portions are formed in the element formation layer 1319 by laser irradiation, and then the first sheet material 1320 is attached to one surface of the element formation layer 1319 (the surface where the insulating film 1318 is exposed), so that the element formation layer 1319 is peeled off the substrate 1301 (see FIG. 9A).

Next, the second sheet material 1321 is attached to the other surface of the element formation layer 1319 (the surface exposed by peeling), and the element formation layer 1319 is peeled off the first sheet material 1320. Therefore, a material with low viscosity is used as the first sheet material 1320. Then, conductive films 1334a and 1334b which are electrically connected to the conductive films 1331a and 1331b respectively through the opening portions are selectively formed (see FIG. 9B).

The conductive films 1334a and 1334b are formed of a conductive material by a CVD method, a sputtering method, a printing method such as screen printing or gravure printing, a droplet discharging method, a dispenser method, a plating method, or the like. The conductive films 1334a and 1334b are formed with a single layer or a stacked layer of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the element as its main component.

Although the example shown in this embodiment mode is the case where the conductive films 1334a and 1334b are formed after peeling the element formation layer 1319 off the substrate 1301, the element formation layer 1319 may be peeled off the substrate 1301 after the formation of the conductive films 1334a and 1334b.

Figure 10A:
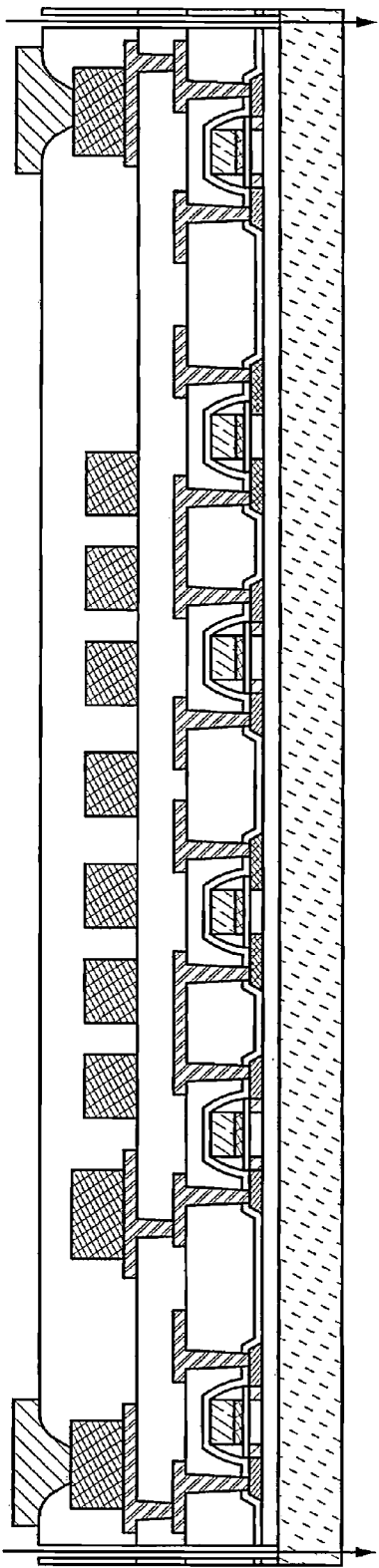
FIGS. 10A and 10B show an example of a method for manufacturing a semiconductor device of the present invention.

Next, in the case where a plurality of elements are formed over the substrate, the element formation layer 1319 is cut into elements (see FIG. 10A). A laser irradiation apparatus, a dicing apparatus, a scribing apparatus, or the like can be used for the cutting. At this time, the plurality of elements formed over one substrate are separated from one another by laser irradiation.

Figure 10B:
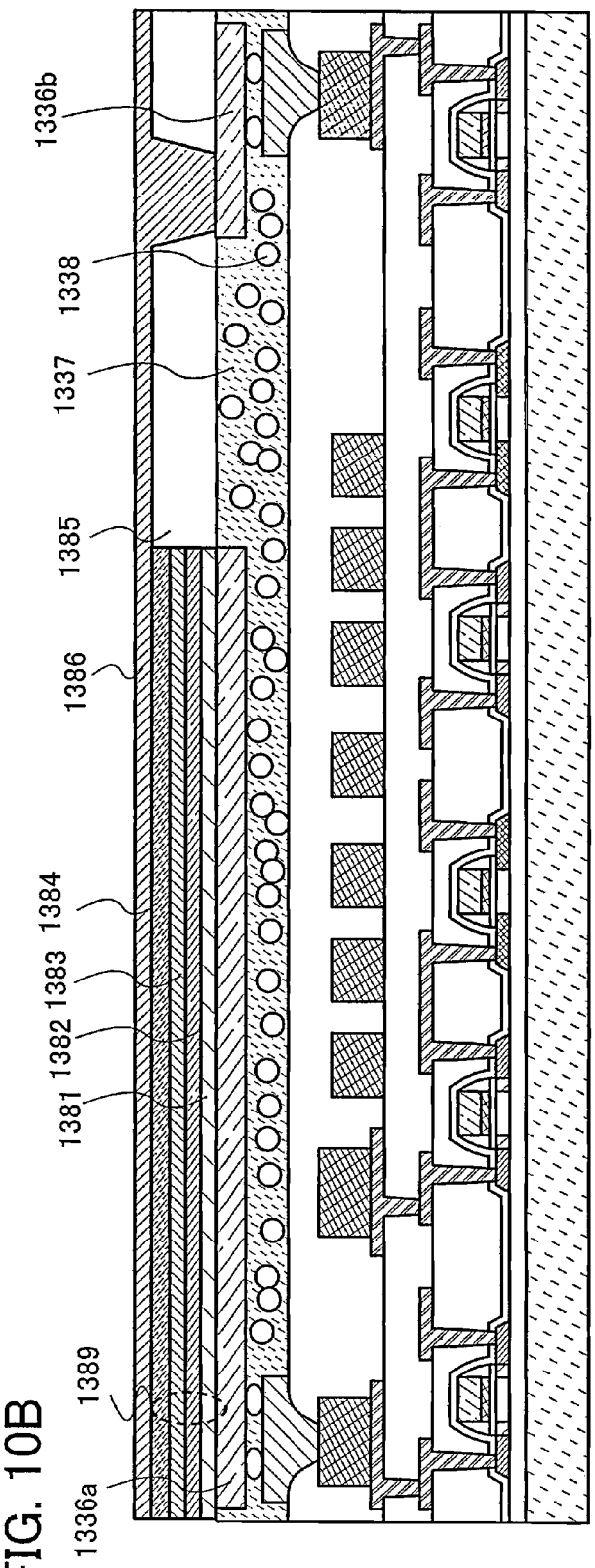

Next, the separated elements are electrically connected to the secondary battery (see FIG. 10B). In this embodiment mode, a thin-film secondary battery is used as the storage capacitor of the power supply circuit, in which a current-collecting thin film, a negative electrode active material layer, a solid electrolyte layer, a positive electrode active material layer, and a current-collecting thin film are sequentially stacked.

Conductive films 1336a and 1336b are formed of a conductive material by a CVD method, a sputtering method, a printing method such as screen printing or gravure printing, a droplet discharging method, a dispenser method, a plating method, or the like. The conductive films 1336a and 1336b are formed with a single layer or a stacked layer of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as its main component. The conductive material should have high adhesion to a negative electrode active material layer and also low resistance. In particular, aluminum, copper, nickel, vanadium, or the like is preferably used.

The structure of a thin-film secondary battery 1389 is described next. A negative electrode active material layer 1381 is formed over the conductive film 1336a. In general, vanadium oxide ($V_2O_5$) or the like is used. Next, a solid electrolyte layer 1382 is formed over the negative electrode active material layer 1381. In general, lithium phosphate ($Li_3PO_4$) or the like is used. Next, a positive electrode active material layer 1383 is formed over the solid electrolyte layer 1382. In general, lithium manganate ($LiMn_2O_4$) or the like is used. Lithium cobaltate ($LiCoO_2$) or lithium nickel oxide ($LiNiO_2$) may also be used. Next, a current-collecting thin film 1384 to serve as an electrode is formed over the positive electrode active material layer 1383. The current-collecting thin film 1384 should have high adhesion to the positive electrode active material layer 1383 and also low resistance. For example, aluminum, copper, nickel, vanadium, or the like can be used.

Each of the above thin layers of the negative electrode active material layer 1381, the solid electrolyte layer 1382, the positive electrode active material layer 1383, and the current-collecting thin film 1384 may be formed by a sputtering technique or an evaporation technique. In addition, the thickness of each layer is preferably 0.1 to 3 μm.

Next, an interlayer film 1385 is formed by application of a resin. The interlayer film 1385 is etched to form a contact hole. The interlayer film 1385 is not limited to a resin, and other films such as an oxide film formed by CVD method or the like may be used as well; however, a resin is preferably used in terms of flatness. Alternatively, the contact hole may be formed without using etching, but using a photosensitive resin. Next, a wiring layer 1386 is formed over the interlayer film 1385 and connected to the conductive film 1336b. Thus, an electrical connection of the thin-film secondary battery is secured.

Here, the conductive films 1334a and 1334b which are provided in the element formation layer 1319 are connected to the conductive films 1336a and 1336b respectively in advance, which serve as the connection terminals of the thin-film secondary battery 1389. Here, an example is shown in which an electrical connection between the conductive films 1334a and 1336a or an electrical connection between the conductive films 1334b and 1336b is performed by pressure bonding with an adhesive material such as an anisotropic conductive film (ACF) or an anisotropic conductive paste (ACP) interposed therebetween. In this embodiment mode, the example is shown, in which the connection is performed using conductive particles 1338 included in an adhesive resin 1337. Alternatively, a conductive adhesive such as a silver paste, a copper paste, or a carbon paste; solder joint; or the like can be used.

The structures of such transistors can be various without being limited to the specific structures shown in this embodiment mode. For example, a multi-gate structure having two or more gate electrodes may be employed. When a multi-gate structure is employed, a structure in which channel regions are connected in series is provided; therefore, a structure in which a plurality of transistors are connected in series is provided. When a multi-gate structure is employed, various advantages can be obtained in that off-current can be reduced; withstand voltage of the transistor can be increased, so that the reliability is increased; and even if drain-source voltage changes when the transistor operates in the saturation region, a drain-source current does not change very much, and thus flat characteristics can be obtained. In addition, a structure in which gate electrodes are formed above and below a channel may also be employed. When a structure in which gate electrodes are formed above and below a channel is employed, the channel region is enlarged and the amount of current flowing therethrough can be increased. Thus, a depletion layer can be easily formed and the subthreshold swing (S value) can be decreased. When gate electrodes are formed above and below a channel, a structure in which a plurality of transistors are connected in parallel is provided.

In addition, the transistors may have any of the following structures: a structure in which a gate electrode is formed above a channel; a structure in which a gate electrode is formed below a channel; a staggered structure; an inverted staggered structure. In addition, the transistors may have a structure in which a channel region is divided into a plurality of regions and the divided regions are connected in parallel or in series. In addition, a channel (or part thereof) may overlap with a source electrode or a drain electrode. When a structure in which a channel (or part thereof) overlaps with a source electrode or a drain electrode is employed, electric charges can be prevented from being accumulated in part of the channel and thus an unstable operation can be prevented. In addition, an LDD (Lightly Doped Drain) region may be provided. When an LDD region is provided, off-current can be reduced; the withstand voltage of the transistor can be increased, so that the reliability is increased; and even if drain-source voltage changes when the transistor operates in the saturation region, drain-source current does not change very much, and thus flat characteristics can be obtained.

The method for manufacturing the semiconductor device in this embodiment mode can be applied to any of the semiconductor devices in the other embodiment modes.

Embodiment Mode 5

Embodiment Mode 5 describes an example of a method for manufacturing the semiconductor device described in the above embodiment modes, with reference to drawings. This embodiment mode describes a structure in which an antenna circuit and a power supply circuit in a CPU are formed over the same substrate. It is to be noted that an antenna circuit and a power supply circuit are formed using transistors including channel formation regions formed on a single crystal substrate, at a time over the same substrate. When transistors formed using a single crystal substrate are used as the transistors, a semiconductor device having transistors with few characteristic variations can be formed, which is preferable. In addition, this embodiment mode describes an example in which the thin-film secondary battery described in Embodiment Mode 4 is used as the storage capacitor of the power supply circuit.

First, insulating films (also referred to as field oxide films) 2302 are formed on a semiconductor substrate 2300 to form regions (also referred to as element formation regions or element separation regions) 2304 and 2306 (see FIG. 11A). The regions 2304 and 2306 provided in the semiconductor substrate are insulated from each other by the insulating film 2302. The example shown here is the case where a single crystal Si substrate having n-type conductivity is used as the semiconductor substrate 2300, and a p well 2307 is formed in the region 2306 of the semiconductor substrate 2300.

Any substrate can be used as the substrate 2300 as long as it is a semiconductor substrate. For example, a single crystal Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (Silicon on Insulator) substrate formed by a bonding method or a SIMOX (Separation by IMplanted OXygen) method, or the like can be used.

The regions 2304 and 2306 can be formed by a LOCOS (LOCal Oxidation of Silicon) method, a trench isolation method, or the like.

In addition, the p well 2307 formed in the region 2306 of the semiconductor substrate 2300 can be formed by selective doping of the semiconductor substrate 2300 with a p-type impurity element. As a p-type impurity element, boron (B), aluminum (Al), gallium (Ga), or the like can be used.

In this embodiment mode, although the region 2304 is not doped with an impurity element because a semiconductor substrate having n-type conductivity is used as the semiconductor substrate 2300, an n well may be formed in the region 2304 by introduction of an n-type impurity element. As an n-type impurity element, phosphorus (P), arsenic (As), or the like can be used. When a semiconductor substrate having p-type conductivity is used, on the other hand, the region 2304 may be doped with an n-type impurity element to form an n well, whereas the region 2306 may be doped with no impurity element.

Next, insulating films 2332 and 2334 are formed so as to cover the regions 2304 and 2306, respectively (see FIG. 11B).

For example, surfaces of the regions 2304 and 2306 provided in the semiconductor substrate 2300 are oxidized by heat treatment, so that the insulating films 2332 and 2334 can be formed of silicon oxide films. Alternatively, the insulating films 2332 and 2334 may be formed to have a stacked structure of a silicon oxide film and a film containing oxygen and nitrogen (a silicon oxynitride film) by the steps of forming a silicon oxide film by a thermal oxidation method and then nitriding the surface of the silicon oxide film by nitridation treatment.

Further alternatively, the insulating films 2332 and 2334 can be formed by plasma treatment as described above. For example, the insulating films 2332 and 2334 can be formed using a silicon oxide ($SiO_x$) film or a silicon nitride ($SiN_x$) film which is obtained by application of high-density plasma oxidation or high-density plasma nitridation treatment to the surfaces of the regions 2304 and 2306 provided in the semiconductor substrate 2300. Furthermore, after applying high-density plasma oxidation treatment to the surfaces of the regions 2304 and 2306, high-density plasma nitridation treatment may be performed. In that case, silicon oxide films are formed on the surfaces of the regions 2304 and 2306, and then silicon oxynitride films are formed on the silicon oxide films. Thus, the insulating films 2332 and 2334 are each formed to have a stacked structure of the silicon oxide film and the silicon oxynitride film. In addition, after silicon oxide films are formed on the surfaces of the regions 2304 and 2306 by a thermal oxidation method, high-density plasma oxidation or high-density nitridation treatment may be applied to the silicon oxide films.

The insulating films 2332 and 2334 formed over the regions 2304 and 2306 of the semiconductor substrate 2300 respectively function as the gate insulating films of transistors which are completed later.

Next, a conductive film is formed so as to cover the insulating films 2332 and 2334 which are formed over the regions 2304 and 2306, respectively (see FIG. 11C). Here, an example is shown in which the conductive film is formed by sequentially stacking conductive films 2336 and 2338. Needless to say, the conductive film may be formed using a single layer or a stacked structure of three or more layers.

As materials of the conductive films 2336 and 2338, an element selected from tantalum (Ta), tungsten (W), titanium (Ti), molybdenum (Mo), aluminum (Al), copper (Cu), chromium (Cr), niobium (Nb), and the like, or an alloy material or a compound material containing such an element as its main component can be used. Alternatively, a metal nitride film obtained by nitridation of the above element can be used. Besides, a semiconductor material typified by polycrystalline silicon doped with an impurity element such as phosphorus can be used.

In this case, a stacked structure is employed in which the conductive film 2336 is formed using tantalum nitride and the conductive film 2338 is formed thereover using tungsten. Alternatively, it is also possible to form the conductive film 2336 using a single-layer film or a stacked film of tungsten nitride, molybdenum nitride, and/or titanium nitride and form the conductive film 2338 using a single-layer film or a stacked film of tantalum, molybdenum, and/or titanium.

Figure 12A:
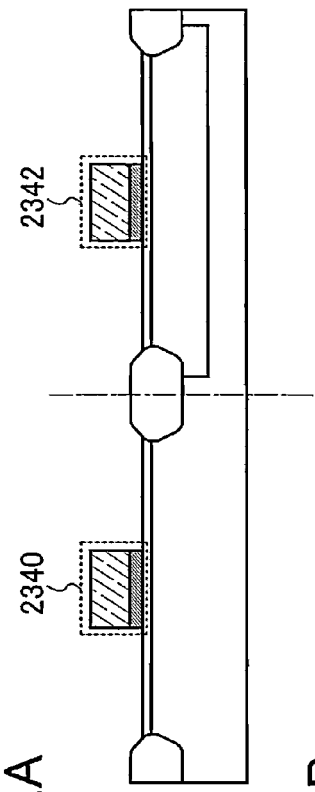
FIGS. 12A to 12C show an example of a method for manufacturing a semiconductor device of the present invention.

Next, the stacked conductive films 2336 and 2338 are selectively removed by etching, so that the conductive films 2336 and 2338 remain above part of the regions 2304 and 2306, respectively. Thus, gate electrodes 2340 and 2342 are formed (see FIG. 12A).

Figure 12B:
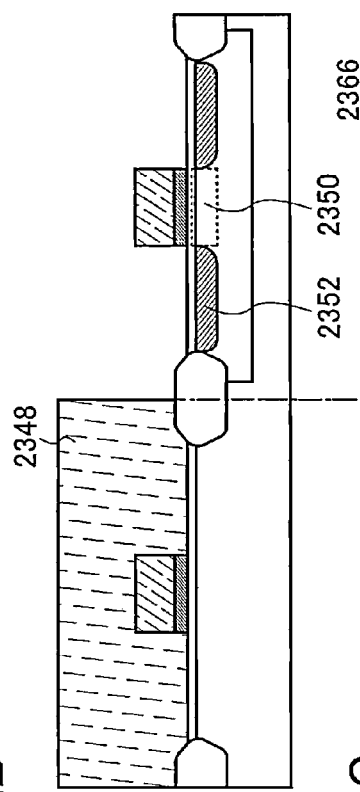

Next, a resist mask 2348 is selectively formed so as to cover the region 2304, and the region 2306 is doped with an impurity element, using the resist mask 2348 and the gate electrode 2342 as masks, so that impurity regions are formed (see FIG. 12B). As an impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. Here, phosphorus (P) is used as the impurity element.

In FIG. 12B, by introduction of an impurity element, impurity regions 2352 which form source and drain regions and a channel formation region 2350 are formed in the region 2306.

Figure 12C:
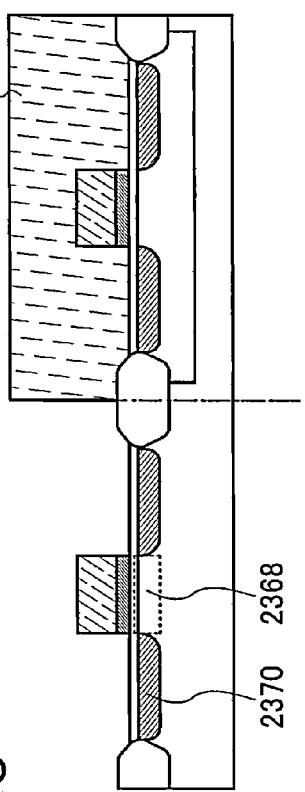

Next, a resist mask 2366 is selectively formed so as to cover the region 2306, and the region 2304 is doped with an impurity element, using the resist mask 2366 and the gate electrode 2340 as masks, so that impurity regions are formed (see FIG. 12C). As the impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. At this time, an impurity element (e.g., boron (B)) of a conductivity type different from that of the impurity element introduced into the region 2306 in FIG. 12B is used. As a result, impurity regions 2370 which form source and drain regions and a channel formation region 2368 are formed in the region 2304.

Next, a second insulating film 2372 is formed so as to cover the insulating films 2332 and 2334 and the gate electrodes 2340 and 2342. Then, wirings 2374, which are electrically connected to the impurity regions 2352 and 2370 formed in the regions 2306 and 2304 respectively, are formed over the second insulating film 2372 (see FIG. 13A).

The second insulating film 2372 can be formed with a single layer or a stacked layer of an insulating film containing oxygen and/or nitrogen such as silicon oxide ($SiO_x$), silicon nitride ($SiN_x$), silicon oxynitride ($SiO_xN_y$, where x>y>0), or silicon nitride oxide ($SiN_xO_y$, where x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method or the like. A siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. Also, a fluoro group may be used as the substituent, or both a fluoro group and an organic group containing at least hydrogen may be used.

The wirings 2374 are formed with a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. The wirings 2374 are preferably formed to have a stacked structure of a barrier film, an aluminum-silicon (Al—Si) film, and a barrier film or a stacked structure of a barrier film, an aluminum-silicon (Al—Si) film, a titanium nitride film, and a barrier film. It is to be noted that the "barrier film" corresponds to a thin film formed of titanium, titanium nitride, molybdenum, or molybdenum nitride. Aluminum and aluminum silicon are suitable materials for forming the wirings 2374 because they have low resistance values and are inexpensive. When barrier layers are provided as the top layer and the bottom layer, generation of hillocks of aluminum or aluminum silicon can be prevented. When a barrier film is formed of titanium which is an element having a high reducing property, even if a thin natural oxide film is formed on the crystalline semiconductor film, the natural oxide film can be reduced, and a favorable contact between the wirings 2374 and the crystalline semiconductor film can be obtained.

It is to be noted that the structure of transistors of the present invention is not limited to the one shown in the drawing. For example, a transistor with an inverted staggered structure, a FinFET structure, or the like can be used. A FinFET structure is preferable because it can suppress a short channel effect which occurs along with reduction in transistor size.

The semiconductor device of the present invention includes the storage capacitor by which power can be stored in the power supply circuit of the CPU. As the storage capacitor, a capacitor such as an electric double layer capacitor or a thin-film secondary battery is preferably used. In this embodiment mode, a connection between the transistor formed in this embodiment mode and a thin-film secondary battery is explained.

In this embodiment mode, the secondary battery is stacked over the wiring 2374 connected to the transistor. The secondary battery has a structure in which a current-collecting thin film, a negative electrode active material layer, a solid electrolyte layer, a positive electrode active material layer, and a current-collecting thin film are sequentially stacked (see FIG. 13B). Therefore, the material of the wiring 2374 which also has a function of the current-collecting thin film of the secondary battery should have high adhesion to the negative electrode active material layer and also low resistance. In particular, aluminum, copper, nickel, vanadium, or the like is preferably used.

Subsequently, the structure of the thin-film secondary battery is described. A negative electrode active material layer 2391 is formed over the wiring 2374. In general, vanadium oxide ($V_2O_5$) or the like is used. Next, a solid electrolyte layer 2392 is formed over the negative electrode active material layer 2391. In general, lithium phosphate ($Li_3PO_4$) or the like is used. Next, a positive electrode active material layer 2393 is formed over the solid electrolyte layer 2392. In general, lithium manganate ($LiMn_2O_4$) or the like is used. Lithium cobaltate ($LiCoO_2$) or lithium nickel oxide ($LiNiO_2$) may also be used. Next, a current-collecting thin film 2394 to serve as an electrode is formed over the positive electrode active material layer 2393. The current-collecting thin film 2394 should have high adhesion to the positive electrode active material layer 2393 and also low resistance. For example, aluminum, copper, nickel, vanadium, or the like can be used.

Each of the above-described thin layers of the negative electrode active material layer 2391, the solid electrolyte layer 2392, the positive electrode active material layer 2393, and the current-collecting thin film 2394 may be formed by a sputtering technique or an evaporation technique. In addition, the thickness of each layer is preferably 0.1 to 3 μm.

Next, an interlayer film 2396 is formed by application of a resin. The interlayer film 2396 is etched to form a contact hole. The interlayer film is not limited to a resin, and other films such as an oxide film formed by CVD method or the like may also be used; however, a resin is preferably used in terms of flatness. In addition, the contact hole may be formed without etching, but using a photosensitive resin. Next, a wiring layer 2395 is formed over the interlayer film 2396 and connected to a wiring 2397. Thus, an electrical connection of the secondary battery is secured.

With the above-described structure, the semiconductor device of the present invention can have a structure in which transistors are formed on a single crystal substrate and a thin-film secondary battery is formed thereover. Thus, by achieving thinning and reduction in size of the CPU, the semiconductor device of the present invention having a lot of flexibility in physical form can be provided.

The method for manufacturing the semiconductor device in this embodiment mode can be applied to any of the semiconductor devices in the other embodiment modes.

Embodiment Mode 6

Embodiment Mode 6 describes an example of a method for manufacturing a semiconductor device, which is different from that described in Embodiment Mode 4, with reference to drawings.

Figure 14A:
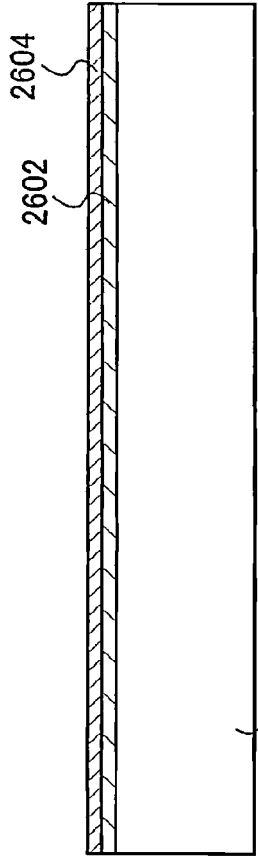
FIGS. 14A to 14C show an example of a method for manufacturing a semiconductor device of the present invention.

First, an insulating film is formed over a substrate 2600. Here, a single crystal Si substrate having n-type conductivity is used as the substrate 2600, and insulating films 2602 and 2604 are formed over the substrate 2600 (see FIG. 14A). For example, silicon oxide ($SiO_x$) is formed as the insulating film 2602 by application of heat treatment to the substrate 2600, and then silicon nitride ($SiN_x$) is formed over the insulating film 2602 by a CVD method.

Any substrate can be used as the substrate 2600 as long as it is a semiconductor substrate, without particular limitations. For example, a single crystal Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (Silicon on Insulator) substrate formed by a bonding method or a SIMOX (Separation by IMplanted OXygen) method, or the like can be used.

In addition, the insulating film 2604 may be formed by nitridation of the insulating film 2602 by high-density plasma treatment, after forming the insulating film 2602. It is to be noted that the insulating film provided over the substrate 2600 may have a single-layer structure or a stacked structure of three or more layers.

Figure 14B:
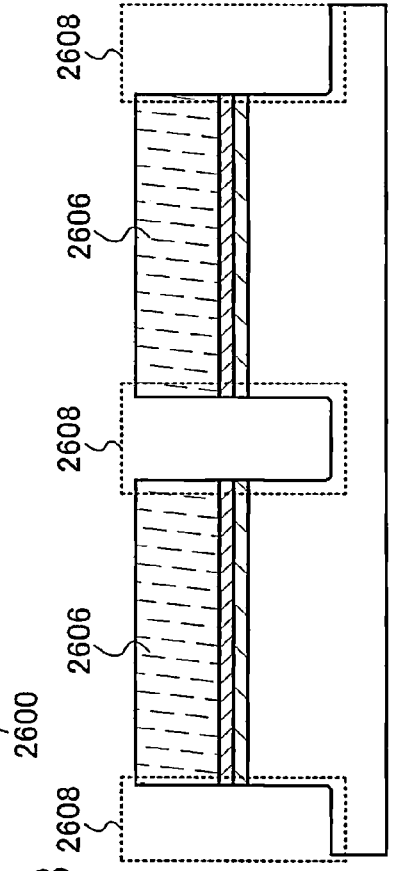

Next, patterns of a resist mask 2606 are selectively formed over the insulating film 2604, and selective etching is performed using the resist mask 2606 as a mask, so that recessed portions 2608 are selectively formed in the substrate 2600 (see FIG. 14B). For the etching of the substrate 2600 and the insulating films 2602 and 2604, plasma dry etching can be conducted.

Figure 14C:
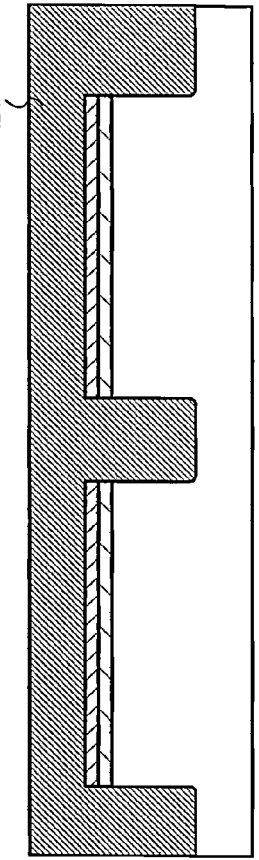

Next, the patterns of the resist mask 2606 are removed, and then an insulating film 2610 is formed so as to fill the recessed portions 2608 formed in the substrate 2600 (see FIG. 14C).

The insulating film 2610 is formed of an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. As the insulating film 2610, a silicon oxide film is formed by an atmospheric pressure CVD method or a low-pressure CVD method using a TEOS (tetraethyl orthosilicate) gas.

Next, the surface of the substrate 2600 is exposed by grinding treatment or polishing treatment such as CMP (Chemical Mechanical Polishing). Here, by exposure of the surface of the substrate 2600, regions 2612 and 2613 are formed between insulating films 2611 which are formed in the recessed portions 2608 of the substrate 2600. The insulating film 2610 formed over the surface of the substrate 2600 is removed by grinding treatment or polishing treatment such as CMP, so that the insulating films 2611 are obtained. Subsequently, by selective introduction of a p-type impurity element, a p well 2615 is formed in the region 2613 of the substrate 2600 (see FIG. 15A).

As a p-type impurity element, boron (B), aluminum (Al), gallium (Ga), or the like can be used. In this case, boron (B) is introduced into the region 2613 as the impurity element.

In this embodiment mode, the region 2612 is not doped with an impurity element because a semiconductor substrate having n-type conductivity is used as the substrate 2600. However, an n well may be formed in the region 2612 by introduction of an n-type impurity element. As an n-type impurity element, phosphorus (P), arsenic (As), or the like can be used.

When a semiconductor substrate having p-type conductivity is used, on the other hand, the region 2612 may be doped with an n-type impurity element to form an n well, whereas the region 2613 may be doped with no impurity element.

Next, insulating films 2632 and 2634 are formed over the surfaces of the regions 2612 and 2613 in the substrate 2600, respectively (see FIG. 15B).

For example, surfaces of the regions 2612 and 2613 provided in the substrate 2600 are oxidized by heat treatment, so that the insulating films 2632 and 2634 of silicon oxide films can be formed. Alternatively, the insulating films 2632 and 2634 may each be formed to have a stacked structure of a silicon oxide film and a film containing oxygen and nitrogen (a silicon oxynitride film) by the steps of forming a silicon oxide film by a thermal oxidation method and then nitriding the surface of the silicon oxide film by nitridation treatment.

Further alternatively, the insulating films 2632 and 2634 may be formed by plasma treatment as described above. For example, the insulating films 2632 and 2634 can be formed with a silicon oxide ($SiO_x$) film or a silicon nitride ($SiN_x$) film which is obtained by application of high-density plasma oxidation or high-density nitridation treatment to the surfaces of the regions 2612 and 2613 provided in the substrate 2600. In addition, after application of high-density plasma oxidation treatment to the surfaces of the regions 2612 and 2613, high-density plasma nitridation treatment may be conducted. In that case, silicon oxide films are formed on the surfaces of the regions 2612 and 2613 and then silicon oxynitride films are formed on the silicon oxide films. Thus, the insulating films 2632 and 2634 are each formed to have a stacked structure of the silicon oxide film and the silicon oxynitride film. In addition, silicon oxide films are formed on the surfaces of the regions 2612 and 2613 by a thermal oxidation method, and then high-density plasma oxidation treatment or high-density plasma nitridation treatment may be performed to the silicon oxide films.

It is to be noted that the insulating films 2632 and 2634 formed over the regions 2612 and 2613 of the substrate 2600 respectively function as the gate insulating films of transistors which are completed later.

Next, a conductive film is formed so as to cover the insulating films 2632 and 2634 which are formed over the regions 2612 and 2613 provided in the substrate 2600, respectively (see FIG. 15C). In this embodiment mode, an example is shown where the conductive film is formed by sequentially stacking conductive films 2636 and 2638. Needless to say, the conductive film may be formed to have a single layer or a stacked structure of three or more layers.

As a material of the conductive films 2636 and 2638, an element selected from tantalum (Ta), tungsten (W), titanium (Ti), molybdenum (Mo), aluminum (Al), copper (Cu), chromium (Cr), niobium (Nb), and the like, or an alloy material or a compound material containing such an element as its main component can be used. Alternatively, a metal nitride film obtained by nitridation of such an element can also be used. Furthermore, a semiconductor material typified by polycrystalline silicon doped with an impurity element such as phosphorus can also be used.

In this case, a stacked structure is employed in which the conductive film 2636 is formed using tantalum nitride and the conductive film 2638 is formed thereover using tungsten. Alternatively, it is also possible to form the conductive film 2636 using a single-layer film or a stacked film of tantalum nitride, tungsten nitride, molybdenum nitride, and/or titanium nitride and form the conductive film 2638 using a single-layer film or a stacked film of tungsten, tantalum, molybdenum, and/or titanium.

Figure 16A:
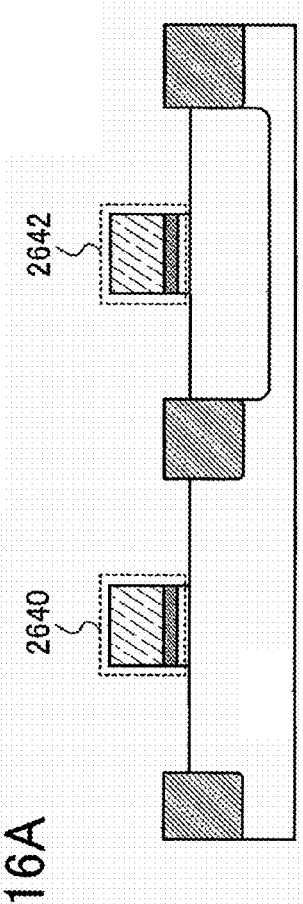
FIGS. 16A to 16C show an example of a method for manufacturing a semiconductor device of the present invention.

Next, the stacked conductive films 2636 and 2638 are selectively removed by etching, so that the conductive films 2636 and 2638 remain above part of the regions 2612 and 2613 of the substrate 2600. Thus, conductive films 2640 and 2642 functioning as gate electrodes are formed (see FIG. 16A). Here, surfaces of the regions 2612 and 2613 of the substrate 2600 which do not overlap with the conductive films 2640 and 2642 respectively are exposed.

Specifically, in the region 2612 of the substrate 2600, a part of the insulating film 2632 formed below the conductive film 2640, which does not overlap with the conductive film 2640, is selectively removed, so that the ends of the conductive film 2640 and the ends of the insulating film 2632 are almost aligned with each other. In addition, in the region 2613 of the substrate 2600, a part of the insulating film 2634 formed below the conductive film 2642, which does not overlap with the conductive film 2642, is selectively removed, so that the ends of the conductive film 2642 and the ends of the insulating film 2634 are almost aligned with each other.

In this case, the part of the insulating films or the like which do not overlap with the conductive films 2640 and 2642 may be removed at the same time as the formation of the conductive films 2640 and 2642. Alternatively, the part of the insulating films which do not overlap with the conductive films 2640 and 2642 may be removed using resist masks which are left after the formation of the conductive films 2640 and 2642 or the conductive films 2640 and 2642 as masks.

Figure 16B:
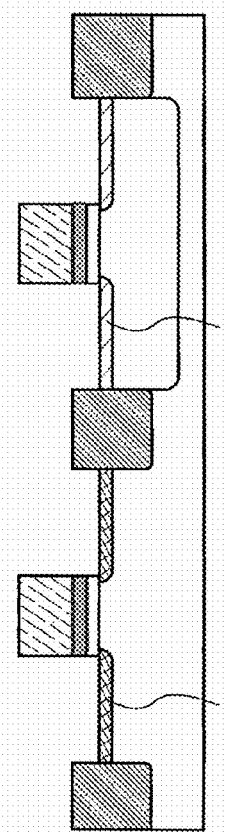

Then, the regions 2612 and 2613 of the substrate 2600 are selectively doped with an impurity element (see FIG. 16B). At this time, the region 2613 is selectively doped with an n-type impurity element at low concentration, using the conductive film 2642 as a mask, to form low concentration impurity regions 2650, whereas the region 2612 is selectively doped with a p-type impurity element at low concentration, using the conductive film 2640 as a mask, to form low concentration impurity regions 2648. As an n-type impurity element, phosphorus (P), arsenic (As), or the like can be used. As a p-type impurity element, boron (B), aluminum (Al), gallium (Ga), or the like can be used.

Next, sidewalls 2654 are formed so as to be in contact with the side surfaces of the conductive films 2640 and 2642. Specifically, the sidewalls are formed with a single layer or a stacked layer of an insulating film such as a film containing an inorganic material such as silicon, silicon oxide, or silicon nitride, and/or a film containing an organic material such as an organic resin by a plasma CVD method, a sputtering method, or the like. Then, the insulating film is selectively etched by anisotropic etching mainly in the perpendicular direction, so that the sidewalls 2654 can be formed so as to be in contact with the side surfaces of the conductive films 2640 and 2642. The sidewalls 2654 are used as masks in doping for forming LDD (Lightly Doped Drain) regions. In addition, the sidewalls 2654 are formed to be in contact with side surfaces of the insulating films formed below the conductive films 2640 and 2642.

Figure 16C:
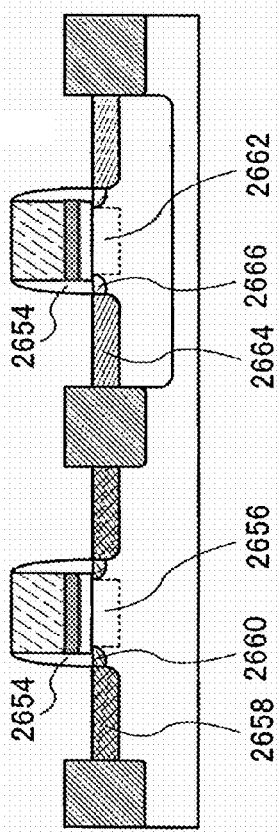

Next, the regions 2612 and 2613 of the substrate 2600 are doped with an impurity element, using the sidewalls 2654 and the conductive films 2640 and 2642 as masks, so that impurity regions which function as source and drain regions are formed (see FIG. 16C). At this time, the region 2613 of the substrate 2600 is doped with an n-type impurity element at high concentration, using the sidewalls 2654 and the conductive film 2642 as masks, whereas the region 2612 is doped with a p-type impurity element at high concentration, using the sidewalls 2654 and the conductive film 2640 as masks.

As a result, impurity regions 2658 which form source and drain regions, low concentration impurity regions 2660 which form LDD regions, and a channel formation region 2656 are formed in the region 2612 of the substrate 2600. Meanwhile, impurity regions 2664 which form source and drain regions, low concentration impurity regions 2666 which form LDD regions, and a channel formation region 2662 are formed in the region 2613 of the substrate 2600.

In this embodiment mode, the impurity elements are introduced under the condition that parts of the regions 2612 and 2613 of the substrate 2600 which do not overlap with the conductive films 2640 and 2642 are exposed. Accordingly, the channel formation regions 2656 and 2662 which are formed in the regions 2612 and 2613 of the substrate 2600 respectively can be formed in a self-aligned manner, due to the conductive films 2640 and 2642.

Next, an insulating film 2677 is formed so as to cover the insulating films, the conductive films, and the like which are provided over the regions 2612 and 2613 of the substrate 2600, and opening portions 2678 are formed in the insulating film 2677 (see FIG. 17A).

The insulating film 2677 can be formed with a single layer or a stacked layer of an insulating film containing oxygen and/or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; or a siloxane material such as a siloxane resin, by a CVD method, a sputtering method, or the like. A siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. In addition, a fluoro group may be used as the substituent. Further, a fluoro group and an organic group containing at least hydrogen may be used as the substituent.

Next, conductive films 2680 are formed in the opening portions 2678. Then, conductive films 2682a to 2682d and 2697 are selectively formed over the insulating film 2677 so as to be electrically connected to the conductive films 2680 (see FIG. 17B).

The conductive films 2680, 2682a to 2682d and 2697 are formed with a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. For example, each of the conductive films 2680, 2682a to 2682d and 2697 is preferably formed to have a stacked structure of a barrier film, an aluminum-silicon (Al—Si) film, and a barrier film or a stacked structure of a barrier film, an aluminum-silicon (Al—Si) film, a titanium nitride film, and a barrier film. It is to be noted that the "barrier film" corresponds to a thin film formed of titanium, titanium nitride, molybdenum, or molybdenum nitride. Aluminum and aluminum silicon are suitable materials for forming the conductive films 2680, 2682a to 2682d and 2697 because they have low resistance values and are inexpensive. When barrier layers are provided as the top layer and the bottom layer, generation of hillocks of aluminum or aluminum silicon can be prevented. When a barrier film is formed of titanium which is an element having a high reducing property, even if a thin natural oxide film is formed on the crystalline semiconductor film, the natural oxide film can be reduced, and a favorable contact between the conductive films 2680 and 2682a to 2682d, and the crystalline semiconductor film can be obtained. Here, the conductive film 2680 can be formed by selective growth of tungsten (W) by a CVD method.

Through the above steps, a p-channel transistor formed in the region 2612 of the substrate 2600 and an n-channel transistor formed in the region 2613 of the substrate 2600 can be obtained.

It is to be noted that the structure of transistors included in the semiconductor device of the present invention is not limited to the one shown in the drawings. For example, a transistor with an inverted staggered structure, a FinFET structure, or the like can be used. A FinFET structure is preferable because it can suppress a short channel effect which occurs along with reduction in transistor size.

The semiconductor device of the present invention is provided with the storage capacitor by which power can be stored in the power supply circuit of the CPU. As the storage capacitor, a capacitor such as an electric double layer capacitor or a thin-film secondary battery is preferably used. In this embodiment mode, a connection between the transistor formed in this embodiment mode and a thin-film secondary battery will be described.

In this embodiment mode, a secondary battery is stacked over the conductive film 2682d connected to the transistor. The secondary battery has a structure in which a current-collecting thin film, a negative electrode active material layer, a solid electrolyte layer, a positive electrode active material layer, and a current-collecting thin film are sequentially stacked (see FIG. 17B). Therefore, the material of the conductive film 2682d which also has a function of the current-collecting thin film of the secondary battery should have high adhesion to the negative electrode active material layer and also low resistance. In particular, aluminum, copper, nickel, vanadium, or the like is preferably used.

Subsequently, the structure of the thin-film secondary battery is described. A negative electrode active material layer 2691 is formed over the conductive film 2682d. In general, vanadium oxide ($V_2O_5$) or the like is used. Next, a solid electrolyte layer 2692 is formed over the negative electrode active material layer 2691. In general, lithium phosphate ($Li_3PO_4$) or the like is used. Next, a positive electrode active material layer 2693 is formed over the solid electrolyte layer 2692. In general, lithium manganate ($LiMn_2O_4$) or the like is used. Lithium cobaltate ($LiCoO_2$) or lithium nickel oxide ($LiNiO_2$) can also be used. Next, a current-collecting thin film 2694 to serve as an electrode is formed over the positive electrode active material layer 2693. The current-collecting thin film 2694 should have high adhesion to the positive electrode active material layer 2693 and also low resistance. For example, aluminum, copper, nickel, vanadium, or the like can be used.

Each of the above-described thin layers of the negative electrode active material layer 2691, the solid electrolyte layer 2692, the positive electrode active material layer 2693, and the current-collecting thin film 2694 may be formed by a sputtering technique or an evaporation technique. In addition, the thickness of each layer is preferably 0.1 to 3 µm.

Next, an interlayer film 2696 is formed by application of a resin. The interlayer film 2696 is etched to form a contact hole. The interlayer film 2696 is not limited to a resin, and other films such as an oxide film formed by CVD method or the like may also be used; however, a resin is preferably used in terms of flatness. In addition, the contact hole may be formed without etching, but using a photosensitive resin. Next, a wiring layer 2695 is formed over the interlayer film 2696 and is connected to the conductive film 2697. Thus, an electrical connection of the thin-film secondary battery is secured.

With the above-described structure, the semiconductor device of the present invention can have a structure in which transistors are formed on a single crystal substrate and a thin-film secondary battery is formed thereover. Thus, by achieving thinning and reduction in size of the CPU, the semiconductor device of the present invention having a lot of flexibility in physical form can be provided.

The method for manufacturing the semiconductor device in this embodiment mode can be applied to any of the semiconductor devices in the other embodiment modes.

Embodiment Mode 7

The semiconductor devices of the present invention can be applied to various electronic devices, specifically to driving of display portions of electronic devices. Such electronic devices include cameras such as video cameras and digital cameras, goggle-type displays, navigation systems, sound reproducing devices (such as car audio systems and audio components), computers, game machines, portable information terminals (such as mobile computers, mobile phones, mobile game machines, and electronic books), image reproducing devices provided with a recording medium (specifically, devices for reproducing content of a recording medium such as a digital versatile disc (DVD) and having a light-emitting device for displaying the reproduced image), and the like.

Figure 18A:
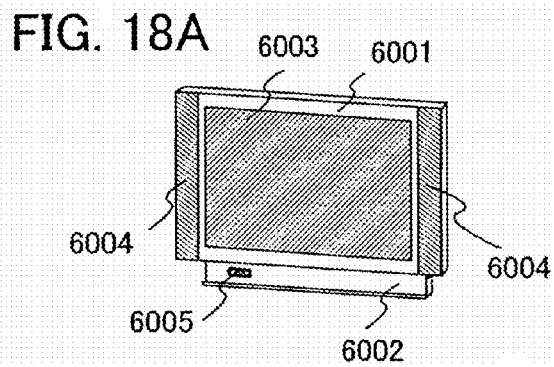
FIGS. 18A to 18H show examples of applications of a semiconductor device of the present invention.

FIG. 18A shows a light-emitting device, which includes a housing 6001, a support base 6002, a display portion 6003, speaker portions 6004, a video input terminal 6005, and the like. The display portion 6003 can be driven by using the semiconductor device of the present invention. Note that the light-emitting device includes various light-emitting devices for displaying information, for example, light-emitting devices for personal computers, television broadcast reception, and advertisement. By using the semiconductor device of the present invention, reduction in power consumption can be achieved. Further, the semiconductor device of the present invention has a lot of flexibility in physical form, which leads to reduction in size of the light-emitting device.

Figure 18B:
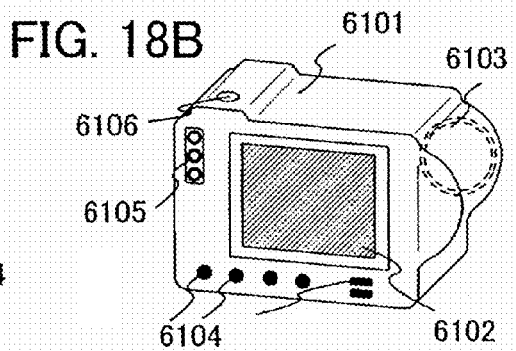

FIG. 18B shows a camera, which includes a main body 6101, a display portion 6102, an image receiving portion 6103, operation keys 6104, an external connection port 6105, a shutter button 6106, and the like. By using the semiconductor device of the present invention, reduction in power consumption can be achieved. Further, the semiconductor device of the present invention has a lot of flexibility in physical form, which leads to reduction in size of the camera.

Figure 18C:
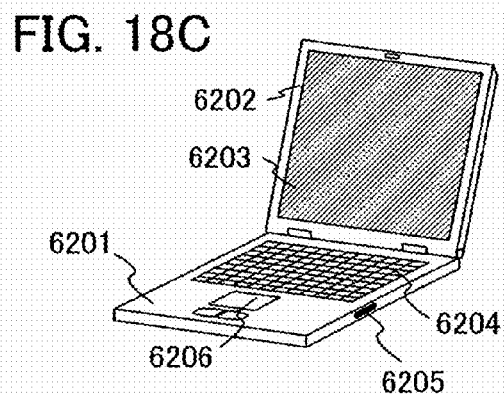

FIG. 18C shows a computer, which includes a main body 6201, a housing 6202, a display portion 6203, a keyboard 6204, an external connection port 6205, a pointing device 6206, and the like. By using the semiconductor device of the present invention, reduction in power consumption can be achieved. Further, the semiconductor device of the present invention has a lot of flexibility in physical form, which leads to reduction in size of the computer.

Figure 18D:
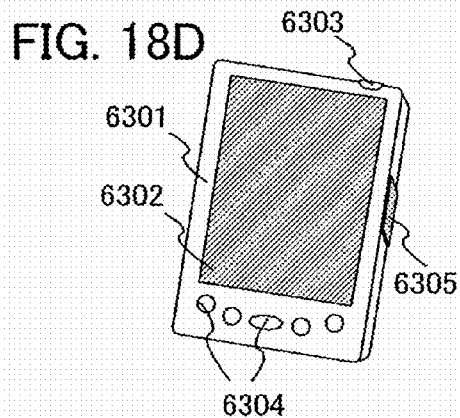

FIG. 18D shows a mobile computer, which includes a main body 6301, a display portion 6302, a switch 6303, operation keys 6304, an infrared port 6305, and the like. By using the semiconductor device of the present invention, reduction in power consumption can be achieved. Further, the semiconductor device of the present invention has a lot of flexibility in physical form, which leads to reduction in size of the mobile computer.

Figure 18E:
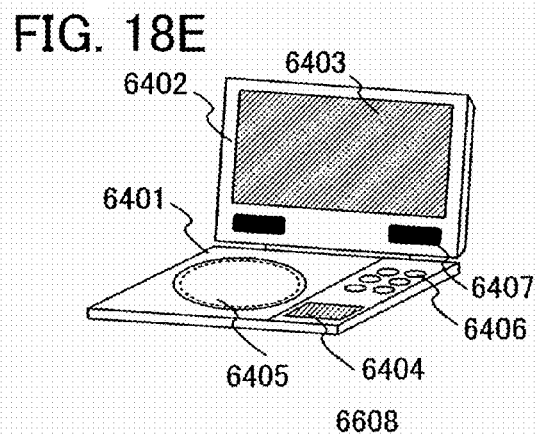

FIG. 18E shows a portable image reproducing device having a recording medium (specifically, a DVD player), which includes a main body 6401, a housing 6402, a display portion A 6403, a display portion B 6404, a recording medium (e.g. DVD) reading portion 6405, operation keys 6406, a speaker portion 6407, and the like. The display portion A 6403 can mainly display image information and the display portion B 6404 can mainly display text information. By using the semiconductor device of the present invention, reduction in power consumption can be achieved. Further, the semiconductor device of the present invention has a lot of flexibility in physical form, which leads to reduction in size of the portable image reproducing device.

Figure 18F:
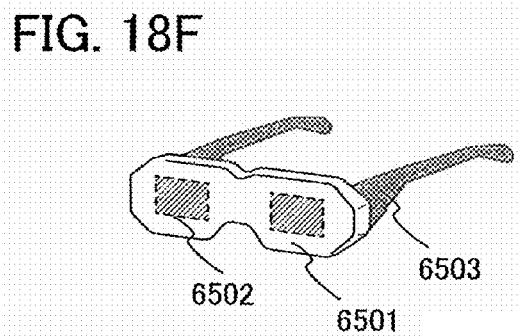

FIG. 18F shows a goggle-type display, which includes a main body 6501, a display portion 6502, and an arm portion 6503. By using the semiconductor device of the present invention, reduction in power consumption can be achieved. Further, the semiconductor device of the present invention has a lot of flexibility in physical form, which leads to reduction in size of the goggle-type display.

Figure 18G:
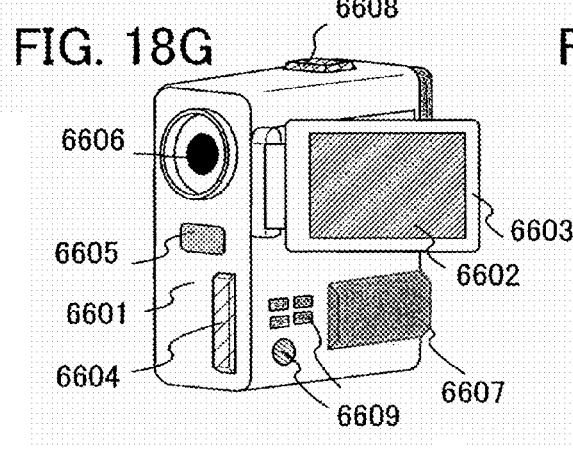

FIG. 18G shows a video camera, which includes a main body 6601, a display portion 6602, a housing 6603, an external connection port 6604, a remote controller receiving portion 6605, an image receiving portion 6606, a battery 6607, an audio input portion 6608, operation keys 6609, and the like. By using the semiconductor device of the present invention, reduction in power consumption can be achieved. Further, the semiconductor device of the present invention has a lot of flexibility in physical form, which leads to reduction in size of the video camera.

Figure 18H:
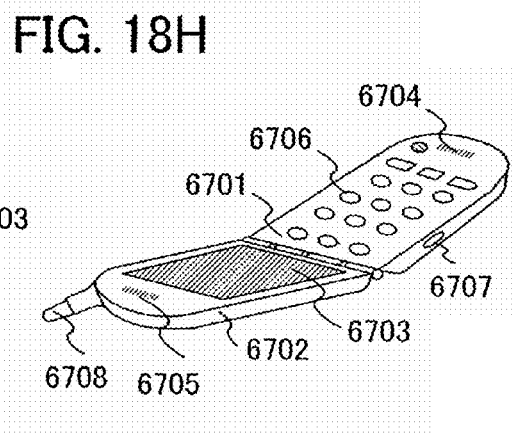

FIG. 18H shows a mobile phone, which includes a main body 6701, a housing 6702, a display portion 6703, an audio input portion 6704, an audio output portion 6705, operation keys 6706, an external connection portion 6707, an antenna 6708, and the like. By using the semiconductor device of the present invention, reduction in power consumption can be achieved. Further, the semiconductor device of the present invention has a lot of flexibility in physical form, which leads to reduction in size of the mobile phone.

As described above, the semiconductor device of the present invention can be applied to various electronic devices.

The structure of the semiconductor device and the method for manufacturing the semiconductor device in this embodiment mode can be applied to any of the semiconductor devices in the other embodiment modes.

This application is based on Japanese Patent Application serial No. 2006-296650 filed in Japan Patent Office on Oct. 31, 2006, the entire contents of which are hereby incorporated by reference.

What is claimed is:

1. A device comprising:
   a first CPU;
   a second CPU; and
   a router circuit;
   wherein each of the first CPU and the second CPU includes:
      a first wireless circuit which includes a first antenna circuit, a first demodulation circuit, and a first modulation circuit; and
      a CPU core which includes a control circuit, an arithmetic circuit, a cache memory, and a general purpose register,
   wherein the router circuit includes:
      a data processing circuit; and
      a second wireless circuit which includes a second antenna circuit, a second demodulation circuit, and a second modulation circuit,
   wherein the first wireless circuit and the second wireless circuit each are configured to transmit and receive data between a corresponding one of the first CPU and the second CPU and the router circuit wirelessly, and
   wherein the first wireless circuit is configured to transmit data to the second wireless circuit by a backscattering method.

2. The device according to claim 1, wherein each of the first CPU and the second CPU comprises a transistor which includes a semiconductor film formed over a substrate having an insulating surface.

3. The device according to claim 2, wherein the transistor is a transistor formed over a glass substrate or a plastic substrate.

4. The device according to claim 2, wherein the transistor is a transistor formed on a semiconductor substrate.

5. A device comprising:
   a first CPU;
   a second CPU; and
   a router circuit;
   wherein each of the first CPU and the second CPU includes:
      a first wireless circuit which includes a first antenna circuit, a first demodulation circuit, a first modulation circuit and a power supply circuit; and
      a CPU core which includes a control circuit, an arithmetic circuit, a cache memory, and a general purpose register,
   wherein the power supply circuit is configured to generate a power supply voltage to be supplied to a corresponding one of the first CPU and the second CPU from a wireless signal received by the first antenna circuit,
wherein the router circuit includes:
  a data processing circuit; and
  a second wireless circuit which includes a second antenna circuit, a second demodulation circuit, and a second modulation circuit,
wherein the first wireless circuit and the second wireless circuit each are configured to transmit and receive data between the CPU and the router circuit wirelessly, and
wherein the first wireless circuit is configured to transmit data to the second wireless circuit by a backscattering method.

6. The device according to claim 5, wherein each of the first CPU and the second CPU comprises a transistor which includes a semiconductor thin film formed over a substrate having an insulating surface.

7. The device according to claim 6, wherein the transistor is a transistor formed over a glass substrate or a plastic substrate.

8. The device according to claim 6, wherein the transistor is a transistor formed on a semiconductor substrate.

* * * * *